(12) United States Patent
 Takanohashi

(10) Patent No.: US 10,082,906 B2
(45) Date of Patent: *Sep. 25, 2018

(54) TOUCH DETECTION CIRCUIT

(71) Applicant: Sony Corporation, Tokyo (JP)

(72) Inventor: Kazukuni Takanohashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,006

(22) Filed: Mar. 23, 2017

(65) Prior Publication Data

US 2017/0192603 A1 Jul. 6, 2017

Related U.S. Application Data

(62) Division of application No. 14/339,666, filed on Jul. 24, 2014, now Pat. No. 9,639,200.

(30) Foreign Application Priority Data

Aug. 6, 2013 (JP) .................................. 2013-162925

(51) Int. Cl.
 *G06F 3/041* (2006.01)
 *G06F 3/044* (2006.01)
 *G06F 3/0488* (2013.01)

(52) U.S. Cl.
 CPC .......... *G06F 3/0416* (2013.01); *G06F 3/044* (2013.01); *G06F 3/04883* (2013.01); *G06F 2203/04104* (2013.01); *G06F 2203/04108* (2013.01)

(58) Field of Classification Search
 CPC .... G06F 3/0416; G06F 3/044; G06F 3/04883; G06F 2203/04108; G06F 2203/04104
 USPC ................................................... 345/173–178
 See application file for complete search history.

(56) References Cited

U.S. PATENT DOCUMENTS

| 9,639,200 B2 * | 5/2017 | Takanohashi ......... G06F 3/0416 |
| 2012/0075211 A1 * | 3/2012 | Tsuzaki ................. G06F 3/0416 |
| | | 345/173 |

FOREIGN PATENT DOCUMENTS

JP 2012-069066 A 4/2012

* cited by examiner

*Primary Examiner* — Amit Chatly
(74) *Attorney, Agent, or Firm* — K&L Gates LLP

(57) ABSTRACT

A touch detection circuit includes: a map generation section configured to compare a touch signal corresponding to a proximity state of an external proximity object with each of a plurality of thresholds to generate a plurality of pieces of map data each showing touch regions; a labeling section configured to selectively perform labeling on the touch regions in the plurality of pieces of map data, based on inclusive relationship of the touch regions between the plurality of pieces of map data; and a detection section configured to perform touch detection based on processing results by the labeling section.

4 Claims, 21 Drawing Sheets

| LOW-ORDER MAP DATA | | HIGH-ORDER MAP DATA | |
|---|---|---|---|
| MAPD | L5 | MAPC | L3, L4 |
| MAPC | L3 | MAPB | L1, L2 |
| MAPB | L1 | MAPA | L0 |

FIG. 10

| LOW-ORDER MAP DATA | | HIGH-ORDER MAP DATA | |
|---|---|---|---|
| MAPD | L5 | MAPC | L3, L5 |
| MAPC | L3 | MAPB | L1, L3 |
| MAPB | L1 | MAPA | L1 |

FIG. 11

TOUCH DETECTION CIRCUIT

CROSS-REFERENCE TO RELATED APPLICATIONS

The present application is a divisional of U.S. application Ser. No. 14/339,666, filed Jul. 24, 2014, which claims priority to Japanese Application No. 2013-162925, filed Aug. 6, 2013, the disclosures of which are hereby incorporated by reference.

BACKGROUND

The present disclosure relates to a touch detection circuit and a touch detection method that are used in a touch panel detecting an object that is in contact with or in proximity to the touch panel, and to an electronic apparatus provided with such a touch detection circuit.

In recent years, a touch panel is mounted on various electronic apparatuses such as mobile information terminals including smartphones, portable game machines, and personal computers. In such electronic apparatuses, since a keyboard, buttons, and the like used so far become unnecessary, it is possible to downsize the apparatuses. In addition, various distinctive user interfaces unique for the touch panel have been developed, which allows users to perform information input and operation more intuitively. Accordingly, importance of the touch panel as a user interface is further increased.

In such a touch panel, a touch detection signal corresponding to a proximity state of an object (an external proximity object) that is in contact with or is in proximity to the touch panel and a predetermined threshold are compared to determine a region (a touch region) where touch event is performed. For example, in Japanese Unexamined Patent Application Publication No. 2012-69066, a touch detection device that compares a detection intensity value according to the external proximity object with a plurality of predetermined thresholds is disclosed.

SUMMARY

Incidentally, at the time of operating an electronic apparatus with use of a touch panel, there are a case where one user performs operation with use of a plurality of fingers and a case where a plurality of users performs operation. In such a case, it is necessary for the touch panel to detect a plurality of touch events (multi-touch). Additional features and advantages are described herein, and will be apparent from the following Detailed Description and the figures.

It is desirable to provide a touch detection circuit, a touch detection method, and an electronic apparatus that are capable of detecting a plurality of touch events.

According to an embodiment of the disclosure, there is provided a touch detection circuit including: a map generation section configured to compare a touch signal corresponding to a proximity state of an external proximity object with each of a plurality of thresholds to generate a plurality of pieces of map data each showing touch regions; a labeling section configured to selectively perform labeling on the touch regions in the plurality of pieces of map data, based on inclusive relationship of the touch regions between the plurality of pieces of map data; and a detection section configured to perform touch detection based on processing results by the labeling section.

According to an embodiment of the disclosure, there is provided a touch detection method including: comparing a touch signal corresponding to a proximity state of an external proximity object with each of a plurality of thresholds to generate a plurality of pieces of map data each showing touch regions; selectively performing labeling on the touch regions in the plurality of pieces of map data based on inclusive relationship of the touch regions between the plurality of pieces of map data; and performing touch detection based on labeling results.

According to an embodiment of the disclosure, there is provided an electronic apparatus provided with a touch detection device configured to detect an external proximity object, and a touch detection circuit. The touch detection circuit includes: a map generation section configured to compare a touch signal corresponding to a proximity state of the external proximity object to the touch detection device with each of a plurality of thresholds to generate a plurality of pieces of map data each showing touch regions; a labeling section configured to selectively perform labeling on the touch regions in the plurality of pieces of map data, based on inclusive relationship of the touch regions between the plurality of pieces of map data; and a detection section configured to perform touch detection based on processing results by the labeling section.

In the touch detection circuit, the touch detection method, and the electronic apparatus according to the respective embodiments of the disclosure, the touch signal and the plurality of thresholds are compared to generate the plurality of pieces of map data, and the touch regions in the plurality of pieces of map data are labeled. At this time, the touch regions are selectively subject to labeling based on the inclusive relationship of the touch regions between the plurality of pieces of map data.

According to the touch detection circuit, the touch detection method, and the electronic apparatus according to the respective embodiments of the disclosure, the labeling is selectively performed based on the inclusive relationship of the touch regions between the plurality of pieces of map data. Therefore, it is possible to detect the plurality of touch events.

It is to be understood that both the foregoing general description and the following detailed description are exemplary, and are intended to provide further explanation of the technology as claimed.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIG. 10 is an explanatory diagram illustrating an operation example of the touch region arithmetic section illustrated in FIG. 4.

FIG. 11 is another explanatory diagram illustrating an operation example of the touch region arithmetic section illustrated in FIG. 4.

DETAILED DESCRIPTION

Figure 1:
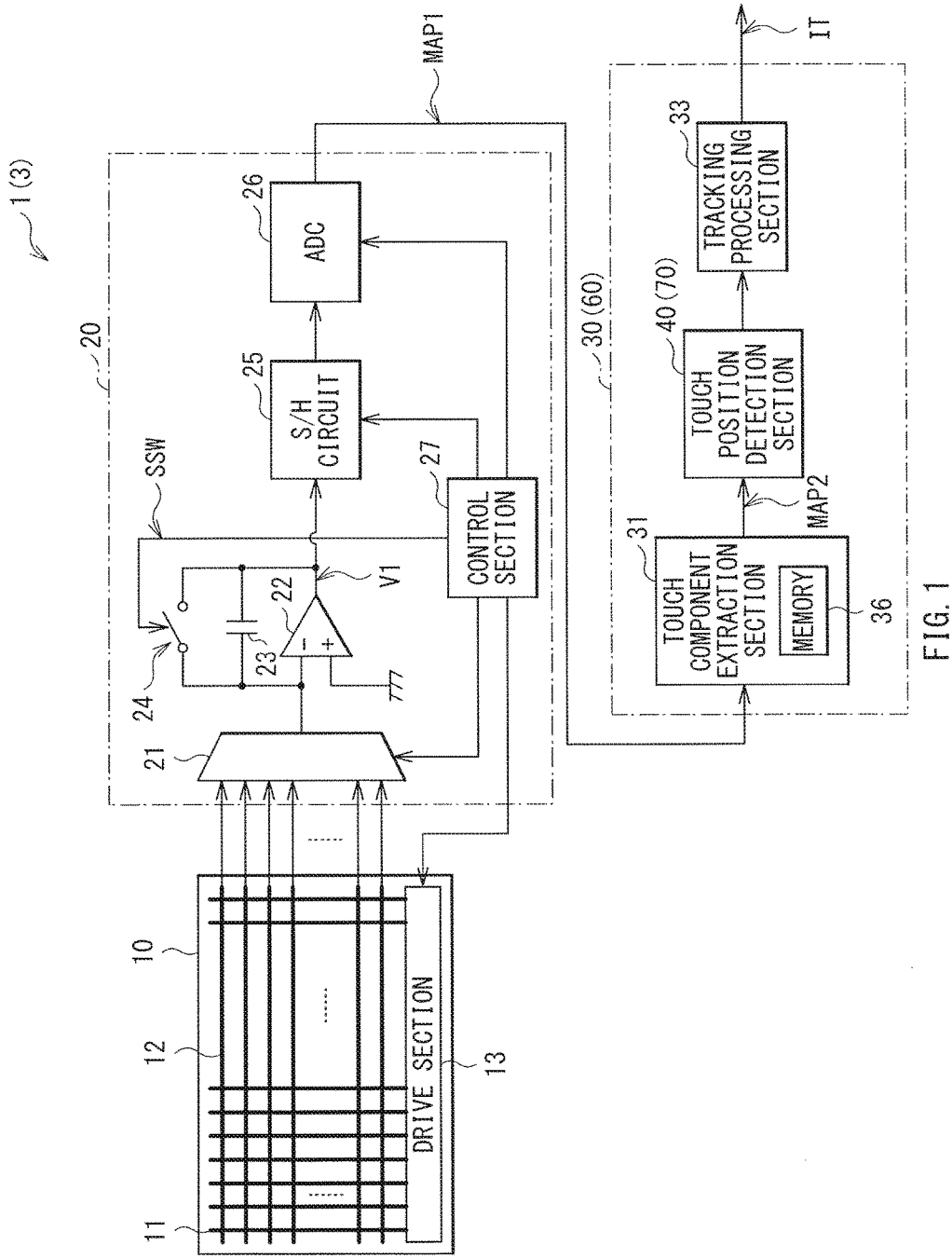
FIG. 1 is a block diagram illustrating a configuration example of a touch panel according to a first embodiment of the disclosure.

Hereinafter, preferred embodiments of the disclosure will be described in detail with reference to drawings. Note that description will be given in the following order.
1. First Embodiment
2. Second Embodiment
3. Third Embodiment
4. Application examples 1. First Embodiment Configuration Example FIG. 1 illustrates a configuration example of a touch panel according to a first embodiment. A touch panel 1 is an electrostatic capacitance type touch panel. Note that a touch detection circuit and a touch detection method according to respective embodiments of the disclosure are embodied by the present embodiment, and thus are described together. The touch panel 1 includes a touch detection device 10, an analog signal processing section 20, and a digital signal processing section 30.

The touch detection device 10 may detect an object (an external proximity object) that is in contact with or in proximity to a touch detection surface, for example, a finger of a user or the like. The touch detection device 10 includes a plurality of drive electrodes 11, a plurality of sensor electrodes 12, and a drive section 13.

The plurality of drive electrodes 11 is each an electrode having a strip shape, and is provided side by side in a direction intersecting an extending direction thereof. One end of each of the drive electrodes 11 is connected to the drive section 13, and is supplied with a drive signal DRV.

The plurality of sensor electrodes 12 is each an electrode that extends in a direction intersecting the extending direction of the plurality of drive electrodes 11, and is provided side by side in a direction intersecting an extending direction thereof. Electrostatic capacitances are formed at parts where the plurality of drive electrodes 11 and the plurality of sensor electrodes 12 intersect. One end of each of the sensor electrodes 12 is connected to the analog signal processing section 20.

The drive section 13 sequentially applies the drive signal DRV to the plurality of drive electrodes 11 based on a control signal (a digital signal) supplied from the analog signal processing section 20.

Figure 2:
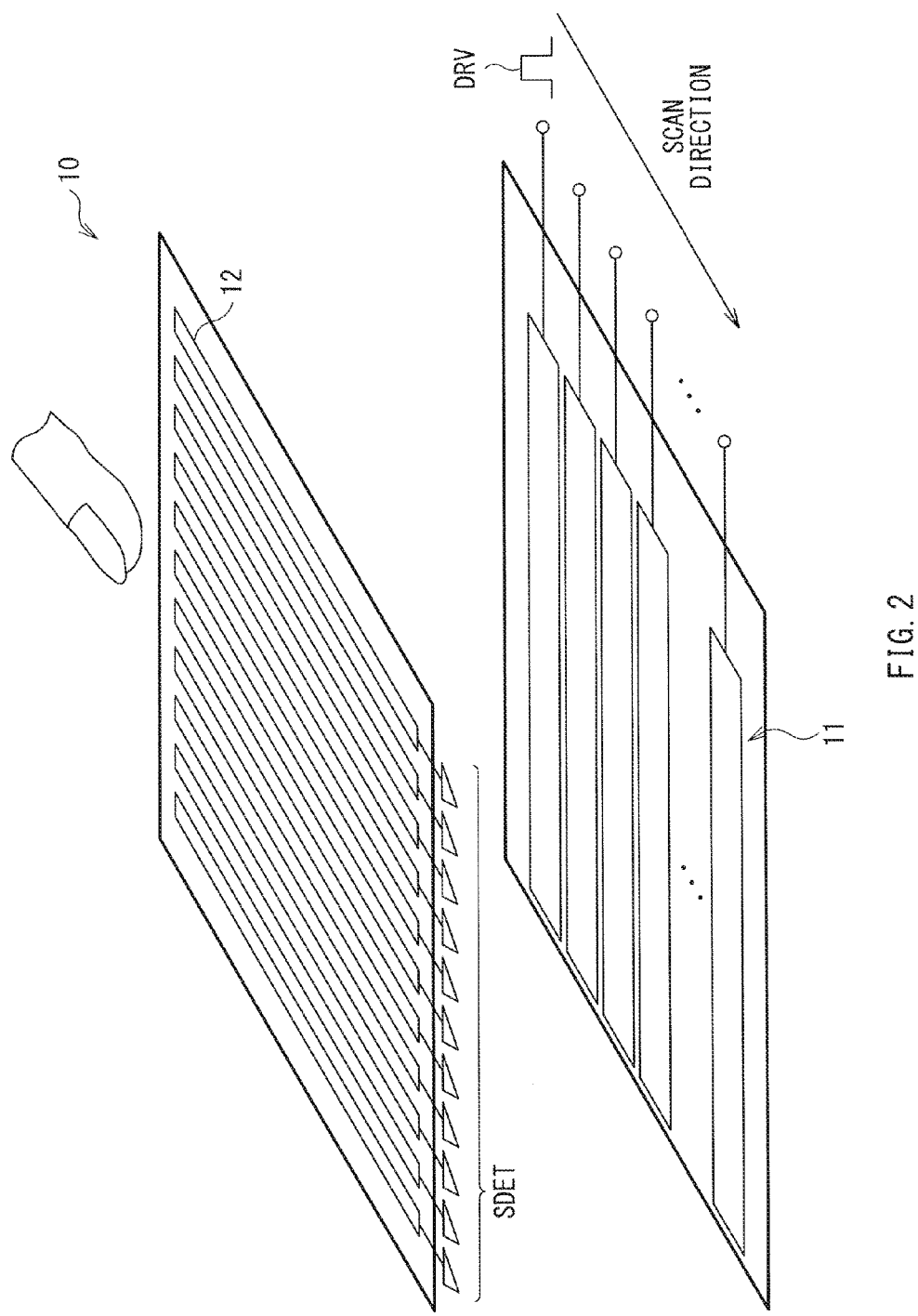
FIG. 2 is a perspective view illustrating a configuration example of a touch detection device illustrated in FIG. 1.

FIG. 2 is a perspective view illustrating a configuration example of the touch detection device 10. In this example, the drive electrodes 11 are provided so as to extend in a lateral direction of the figure, and the sensor electrodes 12 are provided so as to extend in a depth direction of the figure. The drive electrodes 11 and the sensor electrodes 12 are formed in different layers separately from each other. Therefore, the electrostatic capacitances are formed at the parts where the plurality of drive electrodes 11 intersects the plurality of sensor electrodes 12.

Each of the drive electrodes 11 is sequentially supplied with the drive signal DRV by the drive section 13, and is subjected to scan driving. The drive signal DRV is transmitted to the sensor electrodes 12 through the electrostatic capacitances between the drive electrodes 11 and the sensor electrodes 12. At this time, a signal (a detection signal SDET) appearing in each of the sensor electrodes 12 corresponds to a proximity state of the external proximity object. In other words, when the external proximity object is present, an electrostatic capacitance is generated between the sensor electrodes 12 and the external proximity object, in addition to the electrostatic capacitances between the drive electrodes 11 and the sensor electrodes 12. Therefore, the detection signals SDET change based on the proximity state of the external proximity object. The analog signal processing section 20 and the digital signal processing section 30 detect the external proximity object based on such detection signals SDET.

In this way, in the touch detection device 10, the parts where the plurality of drive electrodes 11 intersects the plurality of sensor electrodes 12 each function as an electrostatic capacitance type touch sensor. In the touch detection device 10, such touch sensors are arranged in a matrix. Therefore, scanning is performed over the entire touch detection surface of the touch detection device 10, which makes it possible to detect a position (a coordinate) where contact or proximity of the external proximity object occurs.

The analog signal processing section 20 generates map data MAP1 that indicates a detection result by all of the touch sensors of the touch detection device 10, based on the detection signals SDET supplied from the plurality of sensor electrodes 12 of the touch detection device 10. The analog signal processing section 20 includes a multiplexer 21, an operational amplifier 22, a capacitor 23, a switch 24, a sample and hold (S/H) circuit 25, an analog to digital converter (ADC) 26, and a control section 27.

The multiplexer 21 sequentially selects and outputs one of the detected signals SDET supplied from the plurality of sensor electrodes 12 of the touch detection device 10, based on the control signal supplied from the control section 27. Note that this is not limitative, and alternatively, for example, the multiplexer 21 is not provided and circuits such as operational amplifiers 22 as many as the plurality of sensor electrodes 12 of the touch detection device 10 may be provided, and parallel processing may be performed.

The operational amplifier 22 amplifies and outputs a differential voltage between a voltage at a positive input terminal and a voltage of a negative input terminal. The positive input terminal is grounded in this example. The negative input terminal is connected to an output terminal of the multiplexer 21 and to a first end of the capacitor 23 and a first end of the switch 24. An output terminal of the operational amplifier 22 is connected to a second end of the capacitor 23 and a second end of the switch 24. The first end of the capacitor 23 is connected to the negative input terminal of the operational amplifier 22, and the second end thereof is connected to the output terminal of the operational amplifier 22. The switch 24 is turned on or off based on a control signal SSW supplied from the control section 27. The first end of the switch 24 is connected to the negative input terminal of the operational amplifier 22, and the second end thereof is connected to the output terminal of the operational amplifier 22.

With this configuration, during a period in which the switch 24 is put into OFF state, the operational amplifier 22 and the capacitor 23 integrate the detection signals SDET supplied from the touch detection device 10 and outputs the integrated value as a signal V1. Then, when the switch 24 is put into ON state, both ends of the capacitor 23 are electrically connected to each other, and the integrated value (the output signal of the operational amplifier 22) is reset.

The S/H circuit 25 samples the output signal V1 of the operational amplifier 22 based on the control signal supplied from the control section 27, and holds the sampling results for a certain period of time.

The ADC 26 converts an output signal that is an analog signal, of the S/H circuit 25 into a digital code based on the control signal supplied from the control section 27.

The control section 27 supplies control signals to each of the drive section 13 of the touch detection device 10, the multiplexer 21, the switch 24, the S/H circuit 25, and the ADC 26 to control these circuits to operate in cooperation with one another.

Figure 3:
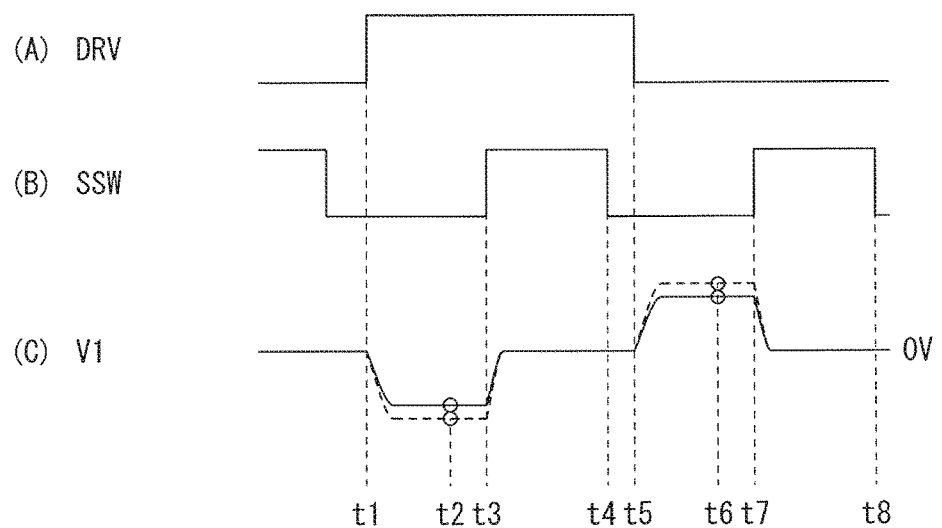
FIG. 3 is a timing waveform chart illustrating an operation example of the touch detection device and an analog signal processing section illustrated in FIG. 1.

FIG. 3 illustrates an operation example of the touch detection device 10 and the analog signal processing section 20, where (A) illustrates a waveform of the drive signal DRV, (B) illustrates a waveform of the control signal SSW, and (C) illustrates a waveform of the signal V1. In this example, the switch 24 is turned on when the control signal SSW is at a high level, and is turned off when the control signal SSW is at a low level. In addition, in (C) of FIG. 3, a solid line indicates a waveform in the case where the external proximity object is present, and a dashed line indicates a waveform in the case where the external proximity object is not present.

First, at a timing t1, the drive section 13 performs transition of a voltage of the drive signal DRV to be applied to a certain drive electrode 11 of the plurality of drive electrodes 11, from low level to high level ((A) of FIG. 3). The drive signal DRV is transmitted to the sensor electrodes 12 through the electrostatic capacitances between the drive electrodes 11 and the sensor electrodes 12, and then is output as the detection signals SDET from the touch detection device 10. Then, the operational amplifier 22 and the capacitor 23 integrate the detection signals SDET, and thus the output signal V1 is decreased to a voltage corresponding to the proximity state of the external proximity object ((C) of FIG. 3).

Then, at a timing t2, the S/H circuit 25 samples the signal V1, and the ADC 26 converts the output signal of the S/H circuit 25 into a digital code ((C) of FIG. 3).

Next, at a timing t3, the control section 27 changes a voltage of the control signal SSW from low level to high level ((B) of FIG. 3). As a result, the switch 24 is turned on, the output signal V1 of the operational amplifier 22 is set to 0 V, and the integrated value is reset ((C) of FIG. 3).

Next, at a timing t4, the control section 27 changes the voltage of the control signal SSW from high level to low level ((B) of FIG. 3). As a result, the switch 24 is turned off, and the operational amplifier 22 and the capacitor 23 are allowed to perform integration operation.

Next, at a timing t5, the drive section 13 performs transition of the voltage of the drive signal DRV from high level to low level ((A) of FIG. 3). In response thereto, similarly to at the timing t1 and subsequent timings, the operational amplifier 22 and the capacitor 23 integrate the detection signals SDET, the signal V1 becomes a voltage corresponding to the proximity state of the external proximity object. At a timing t6, the S/H circuit 25 samples the signal V1, and the ADC 26 converts the output signal of the S/H circuit 25 into a digital code ((C) of FIG. 3). Then, during a period from a timing t7 to a timing t8, the integrated value is reset ((C) of FIG. 3).

In this way, the analog signal processing section 20 generates the digital codes based on the detection signals SDET by the respective touch sensors of the touch detection device 10. In addition, the analog signal processing section 20 outputs the digital codes as the map data MAP1 that is formed of the digital codes of all of the touch sensors on the touch detection surface.

The digital signal processing section 30 obtains the number of touch events, touched positions, change at each touch position, and the like, based on the map data MAP1 supplied from the analog signal processing section 20. The digital signal processing section 30 includes a touch component extraction section 31, a touch position detection section 40, and a tracking processing section 33.

The touch component extraction section 31 generates map data MAP2 for a component (a touch component TC) based on the external proximity object, based on the map data MAP1. The touch component extraction section 13 has a memory 36. The memory 36 holds map data MAP 0 in the case where the external proximity object is not present. With this configuration, first, the touch component extraction section 31 previously stores, as the map data MAP0 in the memory 36, data that is determined that the external proximity object is not present, out of the map data MAP1 supplied from the analog signal processing section 20. Then, the touch component extraction section 31 obtains a difference between the respective digital codes of the map data MAP1 supplied from the analog signal processing section 20 and the respective digital codes in the map data MAP0 stored in the memory 36. Further, based on the difference, the touch component extraction section 31 calculates the touch component TC that becomes a small value close to 0 (zero) when the external proximity object is not present and becomes a larger value with the external proximity object approaching, and generates map data MAP2.

The touch position detection section 40 detects the number of touch events, the touched positions, and the like, based on the map data MAP2.

Figure 4:
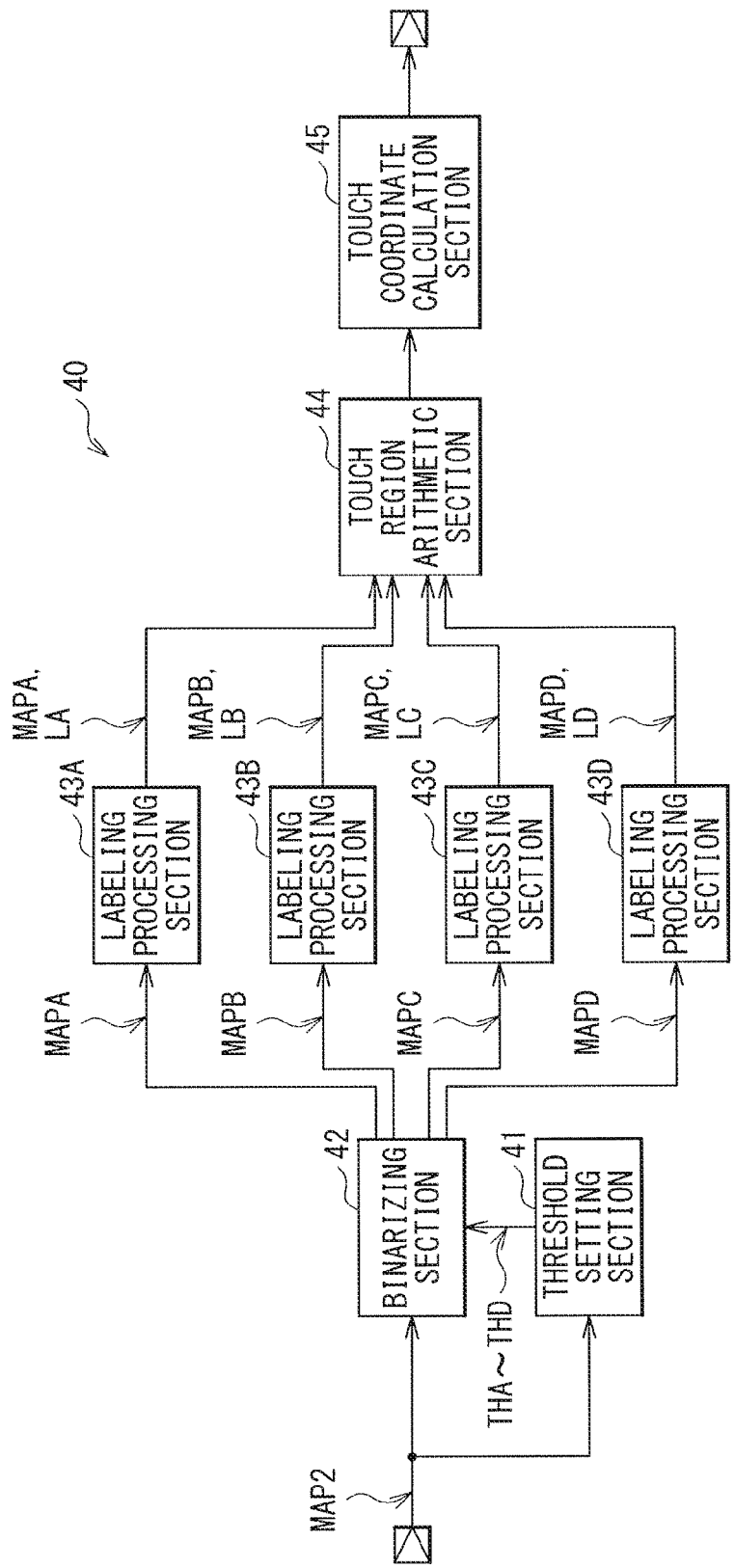
FIG. 4 is a block diagram illustrating a configuration example of a touch position detection section illustrated in FIG. 1.

FIG. 4 illustrates a configuration example of the touch position detection section 40. The touch position detection section 40 includes a threshold setting section 41, a binarizing section 42, four labeling processing sections 43A to 43D, a touch region arithmetic section 44, and a touch coordinate calculation section 45.

The threshold setting section 41 obtains four thresholds THA to THD based on the map data MAP2, and supplies the four thresholds THA to THD to the binarizing section 42. Specifically, as will be described later, the threshold setting section 41 detects a peak value of the touch component TC included in the map data MAP2, and divides the peak value into four values to obtain four thresholds THA to THD.

The binarizing section 42 compares, based on the map data MAP2, the touch component TC included in the map data MAP2 with the four thresholds THA to THD that are supplied from the threshold setting section 41 to perform binarizing processing, and removes Gaussian noise. Then, the binarizing section 42 outputs the results of the binarizing processing as map data MAPA to MAPD.

Figure 5:
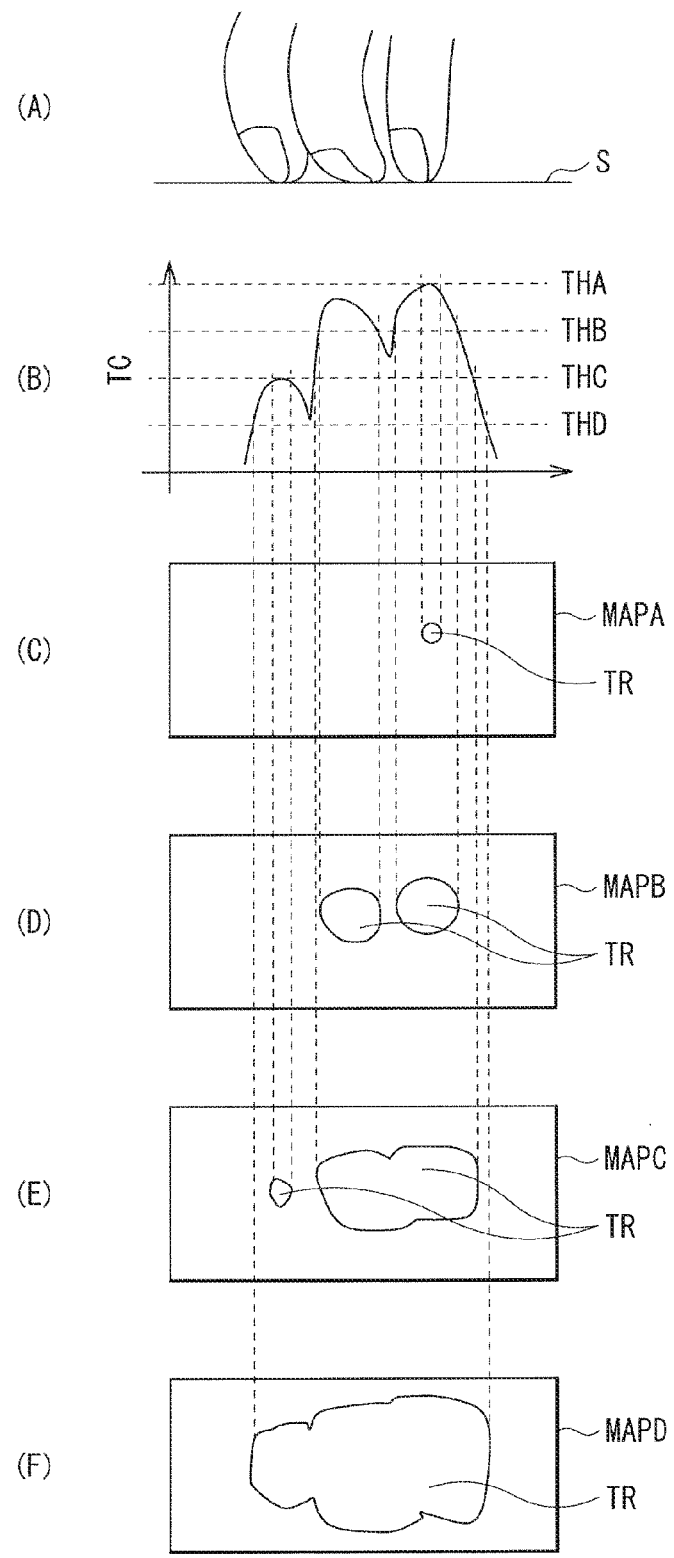
FIG. 5 is an explanatory diagram illustrating an operation example of a threshold setting section and a binarizing section illustrated in FIG. 4.

FIG. 5 illustrates operation of the threshold setting section 41 and the binarizing section 42, where (A) illustrates touch operation by a user, (B) illustrates the touch component TC, and (C) to (F) illustrate map data MAPA to MAPD, respectively.

In this example, as illustrated in (A) of FIG. 5, three fingers of the user are in contact with or in proximity to a touch detection surface S. As illustrated in (B) of FIG. 5, the touch component TC shows a high value at coordinates where the fingers are in contact with or in proximity to the touch detection surface S. The threshold setting section 41 detects a peak value of the touch component Tc, and sets the peak value as the threshold THA. Then, the threshold setting section 41 sets a value that is three-quarters of the threshold THA as the threshold THB, sets a value that is half of the threshold THA as the threshold THC, and sets a value that is a quarter of the threshold THA as the threshold THD.

The binarizing section 42 generates the map data MAPA based on the map data MAP2 and the threshold THA ((C) of FIG. 5). Specifically, the binarizing section 42 sets a value to 1 when the touch component TC is equal to or larger than the threshold THA, and sets the value to 0 when the touch component TC is smaller than the threshold THA, to generate the map data MAPA. In other words, a region indicating "1" in the map data MAPA (a region where the touch component TC is equal to or larger than the threshold THA) is a touched region (a touch region TR) Likewise, the binarizing section 42 generates the map data MAPB based on the map data MAP2 and the threshold THB ((D) of FIG. 5), generates the map data MAPC based on the map data MAP2 and the threshold THC ((E) of FIG. 5), and generates the map data MAPD based on the map data MAP2 and the threshold THD ((F) of FIG. 5).

Note that, in the following description, map data corresponding to a high threshold is referred to as high-order map data, and map data corresponding to a low threshold is referred to as low-order map data, as appropriate. Specifically, for example, the map data MAPA is map data higher order than the map data MAPB, and the map data MAPB is map data lower order than the map data MAPA.

The labeling processing section 43A performs labeling processing based on the map data MAPA. Specifically, the labeling processing section 43A provides different labels from one another to one or a plurality of touch regions TR (one touch region TR in the example of (C) of FIG. 5) included in the map data MAPA. Then, the labeling processing section 43A supplies label information LA that indicates relationship between the respective touch regions TR and the respective labels, together with the map data MAPA, to the touch region arithmetic section 44.

Likewise, the labeling processing sections 43B to 43D perform the labeling processing based on the map data MAPB to MAPD, respectively, and supply the map data MAPB to MAPD and label information LB to LD to the touch region arithmetic section 44, respectively.

The touch region arithmetic section 44 obtains the touch regions TR necessary for calculation of touch positions, based on the map data MAPA to MAPD and the label information LA to LD that are respectively supplied from the labeling processing sections 43A to 43D, as will be described later. The touch coordinate calculation section 45 obtains touch coordinates (touch positions) by a so-called centroid processing, based on the arithmetic results by the touch region arithmetic section 44, and outputs the touch positions together with the number of touch events.

The tracking processing section 33 performs tracking processing based on the information such as the number of touch events and the touch positions that are detected by the touch position detection section 40, and obtains change of the respective touch positions. Specifically, the tracking processing section 33 performs so-called vicinity processing to associate, for example, the respective touch positions obtained by latest scanning with the respective touch positions obtained by last scanning. Accordingly, the tracking processing section 33 obtains change at the respective touch positions. Then, the tracking processing section 33 outputs, as touch information IT, the information about the number of touch events and the touch positions and the information about change at the respective touch positions.

Figure 6:
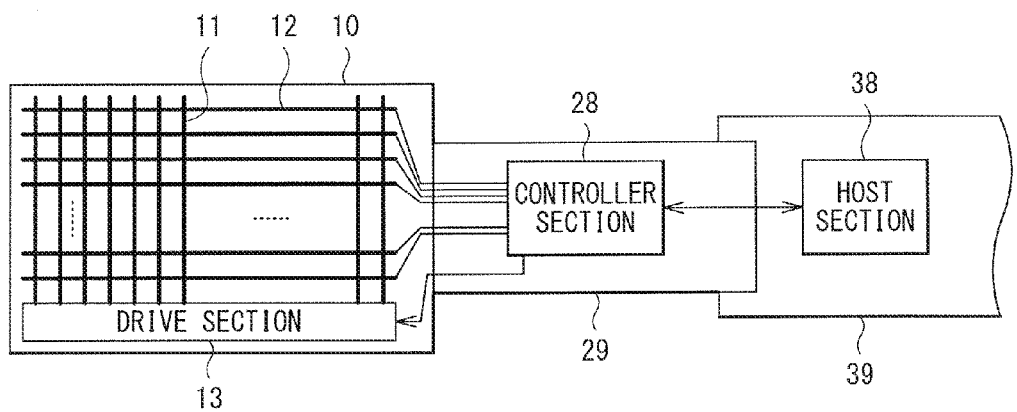
FIG. 6 is an explanatory diagram illustrating a mounting example of the touch panel illustrated in FIG. 1.

FIG. 6 illustrates a mounting example of the touch panel 1. In this example, the analog signal processing section 20 is mounted as a controller section 28 on a flexible printed board 29, and the digital signal processing section 30 is mounted as a host section 38 on a board 39. Note that the configuration is not limited thereto, and for example, a part or all of the digital signal processing section 30 may be mounted as the controller section 28 together with the analog signal processing section 20.

In this example, the map data MAPA to MAPD correspond to a specific example of "a plurality of pieces of map data" in the present disclosure. The binarizing section 42 corresponds to a specific example of "map generation section" in the present disclosure. The labeling processing sections 43A to 43D and the touch region arithmetic section 44 correspond to a specific example of "labeling section" in the present disclosure. The touch coordinate calculation section 45 corresponds to a specific example of "detection section" in the present disclosure.

(Operation and Function)

Subsequently, operation and a function of the touch panel 1 according to the first embodiment will be described.

(Entire Operation Outline)

First, entire operation outline of the touch panel 1 is described with reference to FIG. 1, FIG. 4, and the like. The drive section 13 sequentially applies the drive signal DRV to the plurality of drive electrodes 11, based on the control signal (the digital signal) supplied from the control section 27. The drive signal DRV is transmitted to the sensor electrodes 12 through the electrostatic capacitances between the drive electrodes 11 and the sensor electrodes 12, and is output as the detection signals SDET from the touch detection device 10. The analog signal processing section 20 generates the map data MAP1 that indicates detection results by all of the touch sensors on the touch detection surface of the touch detection device 10, based on the detection signals SDET supplied from the plurality of sensor electrodes 12 of the touch detection device 10.

The touch component extraction section 31 generates the map data MAP2 for the component (the touch component TC) based on the external proximity object, based on the map data MAP1. The threshold setting section 41 of the touch position detection section 40 obtains the four thresholds THA to THD based on the map data MAP2. The binarizing section 42 performs the binarizing processing based on the map data MAP2 and the four thresholds THA to THD to generate the map data MAPA to MAPD. The labeling processing sections 43A to 43D perform the labeling processing based on the map data MAPA to MAPD to generate the label information LA to LD, respectively. The touch region arithmetic section 44 obtains the touch regions TR necessary for the calculation of the touch positions, based on the map data MAPA to MAPD and the label information LA to LD that are respectively supplied from the labeling processing sections 43A to 43D. The touch coordinate calculation section 45 obtains the touch coordinates (the touch positions) based on the arithmetic results by the touch region arithmetic section 44, and outputs the touch positions together with the number of touch events. The tracking processing section 33 performs the tracking processing based on the information such as the number of touch events and the touch positions that are detected by the touch position detection section 40, to obtain change at the respective touch positions.

(Detailed Operation of Touch Position Detection Section 40)

The touch position detection section 40 detects the number of touch events, the touch positions, and the like, based on the map data MAP2. The detailed operation of the touch position detection section 40 is described below by taking the case of the multi-touch illustrated in FIG. 5 as an example.

As illustrated in (A) and (B) of FIG. 5, the threshold value setting section 41 detects the peak value of the touch component TC, and generates the thresholds THA to THD based on the peak value. The binarizing section 42 generates the map data MAPA to MAPD based on the map data MAP2 and the thresholds THA to THD. Then, the labeling processing sections 43A to 43D perform the labeling processing based on the map data MAPA to MAPD, respectively.

Figure 7A:
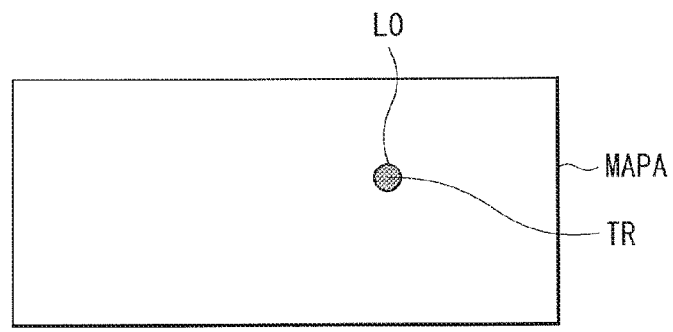
FIG. 7A is an explanatory diagram illustrating an example of map data and label information.
Figure 7B:
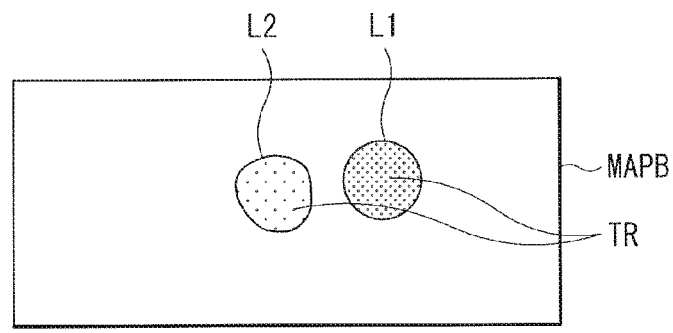
FIG. 7B is another explanatory diagram illustrating an example of the map data and the label information.
Figure 7C:
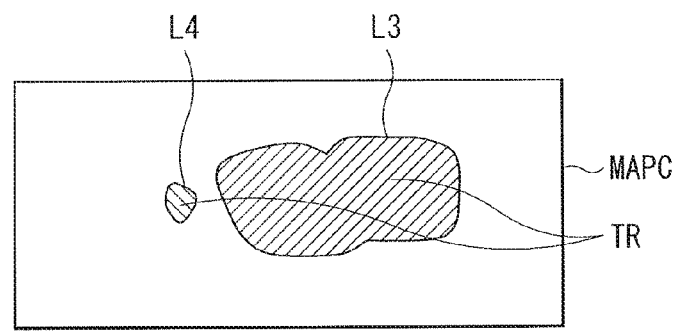
FIG. 7C is another explanatory diagram illustrating an example of the map data and the label information.
Figure 7D:
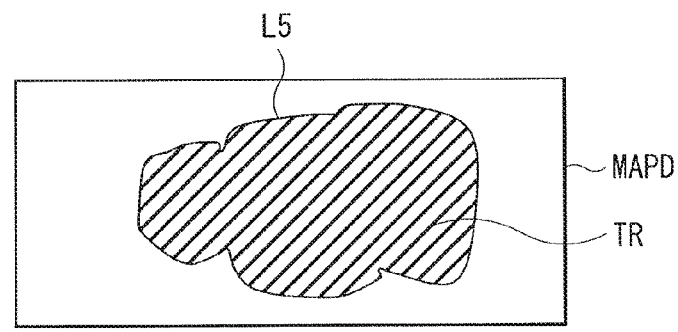
FIG. 7D is another explanatory diagram illustrating an example of the map data and the label information.

FIG. 7A to FIG. 7D illustrates the labeling processing by the labeling processing sections 43A to 43D, respectively. In this example, as illustrated in FIG. 7A, since one touch region TR is included in the map data MAPA, the labeling processing section 43A provides a label L0 to the touch region TR. In addition, as illustrated in FIG. 7B, since two touch regions TR are included in the map data MAPB, the labeling processing section 43B provides labels L1 and L2 to the respective touch regions TR. Moreover, as illustrated in FIG. 7C, since two touch regions TR are included in the map data MAPC, the labeling processing section 43C provides labels L3 and L4 to the respective touch regions TR. Furthermore, as illustrated in FIG. 7D, since one touch region TR is included in the map data MAPD, the labeling processing section 43D provides a label L5 to the touch region TR. In this way, the labeling processing sections 43A to 43D provide the labels to the respective touch region TR included in the respective map data, and generate the label information LA to LD, respectively.

Figure 8:
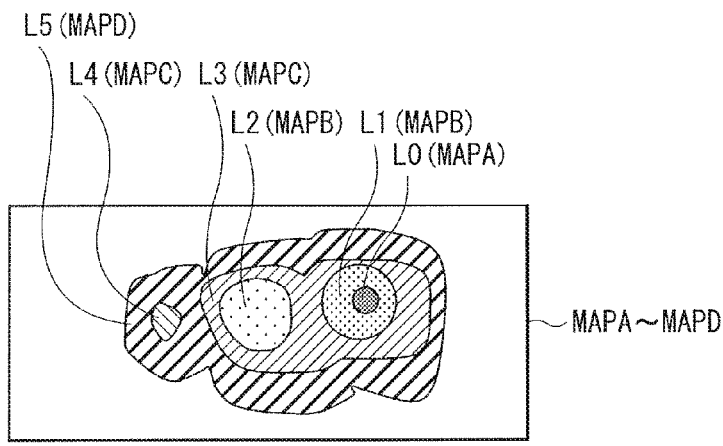
FIG. 8 is an explanatory diagram illustrating inclusive relationship of touch regions.

FIG. 8 illustrates inclusive relationship of the touch regions TR in the map data MAPA to MAPD. The two touch regions TR provided with the labels L3 and L4 in the map data MAPC are included in the touch region TR provided with the label L5 in the map data MAPD. The two touch regions TR provided with the labels L1 and L2 in the map data MAPB are included in the touch region TR provided with the label L3 in the map data MAPC. Further, the touch region TR provided with the label L0 in the map data MAPA is included in the touch region TR provided with the label L1 in the map data MAPB.

The labeling processing sections 43A to 43D supplies the map data MAPA to MAPD and the label information LA to LD to the touch region arithmetic section 44, respectively. Then, the touch region arithmetic section 44 obtains the touch regions TR necessary for calculation of the touch positions based on the information.

Figure 9:
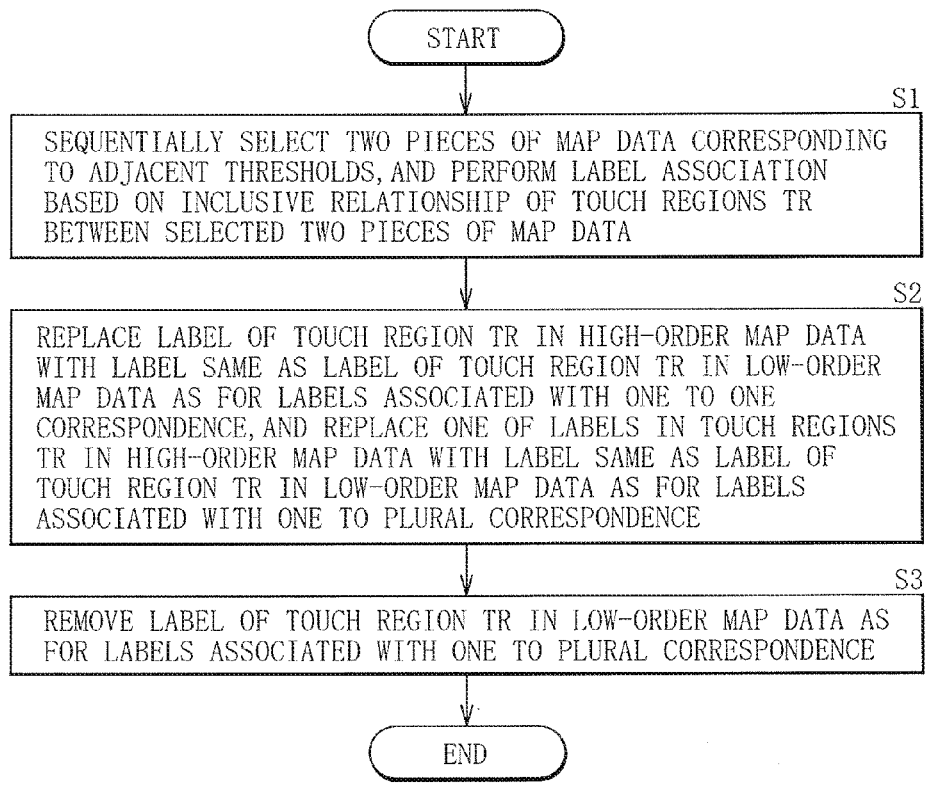
FIG. 9 is a flowchart illustrating an operation example of a touch region arithmetic section illustrated in FIG. 4.

FIG. 9 illustrates a flowchart of operation of the touch region arithmetic section 44. The touch region arithmetic section 44 performs the following flow every time the four pieces of map data MAPA to MAPD and the label information LA to LD are supplied from the labeling processing sections 43A to 43D, respectively.

First, the touch region arithmetic section 44 sequentially selects the two pieces of map data corresponding to the adjacent thresholds out of the map data MAPA to MAPD, and performs label association based on the inclusive relationship of the touch regions TR between the selected two pieces of map data (step S1). Specifically, the touch region arithmetic section 44 performs the label association based on the inclusive relationship between the touch region TR of the map data MAPD and the touch regions TR of the map data MAPC, performs the label association based on the inclusive relationship between the touch region TR of the map data MAPC and the touch regions TR of the map data MAPB, and performs the label association based on the inclusive relationship between the touch region TR of the map data MAPB and the touch region TR of the map data MAPA.

FIG. 10 illustrates the label association. As illustrated in FIG. 10, the touch region arithmetic section 44 associates the label L5 of the touch region TR in the (low-order) map data MAPD with the labels L3 and L4 of the touch regions TR in the (high-order) map data MAPC. In other words, as illustrated in FIG. 8, since the two touch regions TR provided with the labels L3 and L4 are included in the touch region TR provided with the label L5, the touch region arithmetic section 44 associates the label L5 with the two labels L3 and L4 with one to two correspondence. In addition, the touch region arithmetic section 44 associates the label L3 of the touch region TR in the (low-order) map data MAPC with the labels L1 and L2 of the touch regions TR in the (high-order) map data MAPB. In other words, as illustrated in FIG. 8, since the two touch regions TR provided with the labels L1 and L2 are included in the touch region TR provided with the label L3, the touch region arithmetic section 44 associates the label L3 with the two labels L1 and L2 with one to two correspondence. Further, the touch region arithmetic section 44 associates the label L1 of the touch region TR in the (low-order) map data MAPB with the label L0 of the touch region TR in the (high-order) map data MAPA. In other words, as illustrated in FIG. 8, since the touch region TR provided with the label L0 is included in the touch region TR provided with the label L1, the touch region arithmetic section 44 associates the label L1 with the label L0 with one to one correspondence.

Next, as for the labels associated with one to one correspondence, the touch region arithmetic section 44 replaces the label of the touch region TR in the high-order map data with the label same as that of the touch region TR in the low-order map data, and as for the labels associated with one to plural correspondence, the touch region arithmetic section 44 replaces one of the labels of the touch regions TR in the high-order map data with the label same as that of the touch region TR in the low-order map data, to merge labels (step S2).

Figure 12:
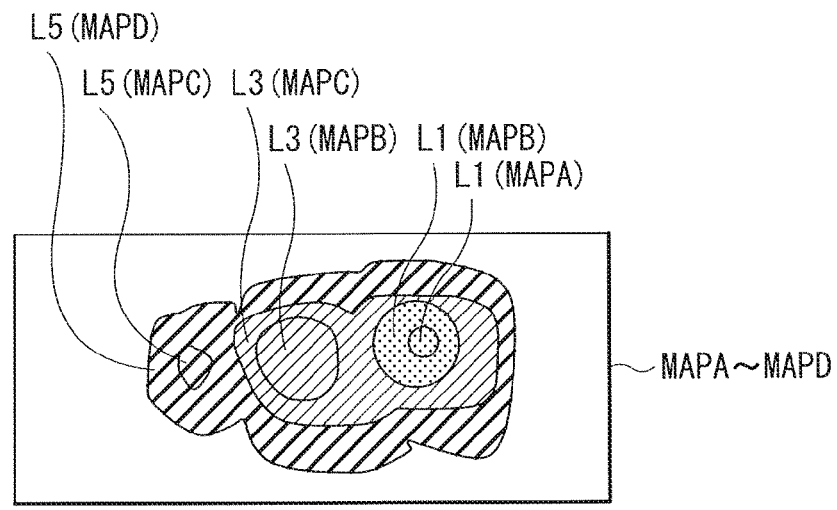
FIG. 12 is another explanatory diagram illustrating an operation example of the touch region arithmetic section illustrated in FIG. 4.

FIG. 11 illustrates replacement of the labels. FIG. 12 illustrates the map data MAPA to MAPD and the label information LA and LB after the label replacement. At step S1, as illustrated in FIG. 10, the touch region arithmetic section 44 associates the label L5 of the touch region TR in the (low-order) map data MAPD with the two labels L3 and L4 of the touch regions TR in the (high-order) map data MAPC with one to two correspondence. Therefore, the touch region arithmetic section 44 replaces one (in this example, the label L4) of the two labels L3 and L4 of the touch regions TR in the high-order map data MAPC with the label L5 (FIG. 11). In addition, at the step S1, as illustrated in FIG. 10, the touch region arithmetic section 44 associates the label L3 of the touch region TR in the (low-order) map data MAPC with the two labels L1 and L2 of the touch regions TR in the (high-order) map data MAPB with one to two correspondence. Therefore, the touch region arithmetic section 44 replaces one (in this example, the label L2) of the two labels L1 and L2 of the touch regions TR in the high-order map data MAPB with the label L3 (FIG. 11). Moreover, at the step S1, as illustrated in FIG. 10, the touch region arithmetic section 44 associates the label L1 of the touch region TR in the (low-order) map data MAPB with the label L0 of the touch region TR in the (high-order) map data MAPA with one to one correspondence. Therefore, the touch region arithmetic section 44 replaces the label L0 of the touch region TR in the high-order map data MAPA with the label L1 (FIG. 11). By performing the label replacement in this way, as illustrated in FIG. 12, the touch region TR provided with the label L1 is included in each of the two pieces of map data MAPA and MAPB, and the touch region TR provided with the label L3 is included in each of the two pieces of map data MAPB and MAPC, and the touch region TR provided with the label L5 is included in each of the two pieces of map data MAPC and MAPD.

Then, as for the labels associated with one to plural correspondence, the touch region arithmetic section 44 removes the label of the touch region TR in the low-order map data (step S3).

Figure 13:
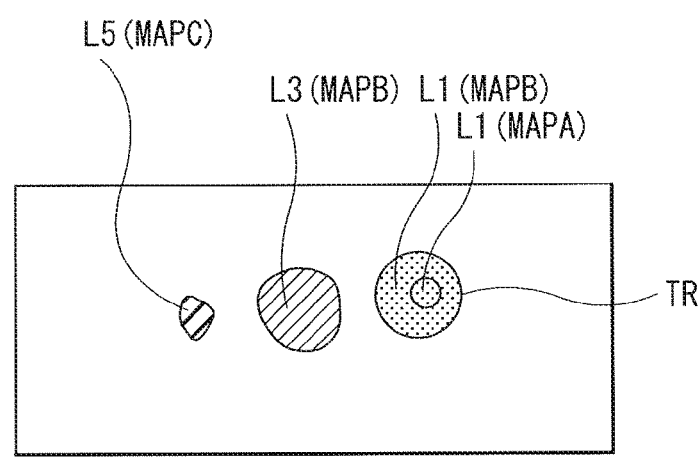
FIG. 13 illustrates the map data MAPA to MAPD and the label information LA and LB according to an embodiment.

FIG. 13 illustrates the map data MAPA to MAPD and the label information LA and LB after the step S3. As illustrated in FIG. 11, at the step S2, the touch region arithmetic section 44 has associated the label L5 of the touch region TR in the (low-order) map data MAPD with the two labels L3 and L5 of the touch regions TR in the (high-order) map data MAPC with one to two correspondence. Therefore, the touch region arithmetic section 44 removes the label L5 of the touch region TR in the low-order map data MAPD. In addition, as illustrated in FIG. 11, at the step S2, the touch region arithmetic section 44 has associated the label L3 of the touch region TR in the (low-order) map data MAPC with the two labels L1 and L3 of the touch regions TR in the (high-order) map data MAPB with one to two correspondence. Therefore, the touch region arithmetic section 44 removes the label L3 of the touch region TR in the low-order map data MAPC. As a result, as illustrated in FIG. 13, the touch region TR provided with the label L3 in the map data MAPC and the touch region TR provided with the label L5 in the map data MAPD disappear, and three touch regions TR that are respectively provided with the labels L1, L3, and L5 and are separated from one another appear.

The touch region arithmetic section 44 obtains the touch regions necessary for calculation of the touch coordinates through the above-described flow.

The touch coordinate calculation section 45 obtains touch coordinates (touch positions) by so-called centroid processing, based on the touch regions TR obtained by the touch region arithmetic section 44.

Figure 14:
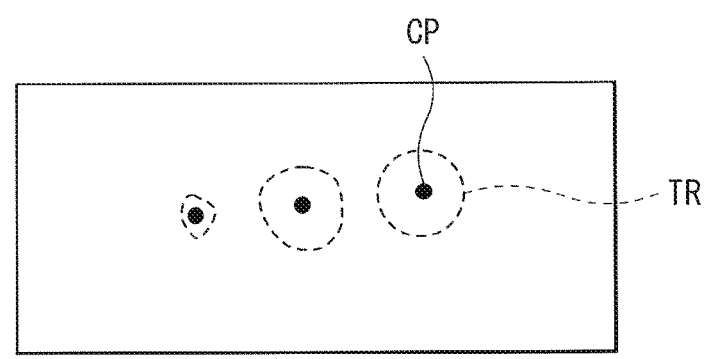
FIG. 14 is an explanatory diagram illustrating an operation example of a touch coordinate calculation section illustrated in FIG. 4.

FIG. 14 illustrates operation of the touch coordinate calculation section 45. The touch coordinate calculation section 45 performs the centroid processing on the touch regions TR obtained by the touch region arithmetic section 44 to obtain a centroid coordinate CP of each of the touch regions TR. Then, the touch coordinate calculation section 45 outputs each centroid coordinate CP as the touch position as well as outputs the number of the touch regions TR (in this example, three) as the number of touch events.

In this way, in the touch panel 1, the threshold setting section 41 obtains the four thresholds THA to THD, based on the peak value of the touch component TC included in the map data MAP2, and the binarizing section 42 performs the binarizing processing with use of the thresholds THA to THD to generate the map data MAPA to MAPD. Further, the labeling processing sections 43A to 43D perform the labeling processing on the map data MAPA to MAPD, respectively, and the touch region arithmetic section 44 performs the label replacement based on the inclusive relationship of the touch regions TR. Accordingly, as will be described in comparison with a comparative example below, in the touch panel 1, it is possible to obtain the touch positions and the number of touch events more accurately even in the case of multi-touch.

Moreover, in the touch panel 1, the labeling processing sections 43A to 43D perform the labeling processing on the binarized map data MAPA to MAPD, respectively. Therefore, it is possible to reduce memory capacity. In other words, for example, when each labeling processing section performs the labeling processing based on the map data MAP2 for the component (the touch component TC) based on the external proximity object, it is necessary for each labeling processing section to have a memory that holds the map data MAP2, namely, a memory that holds the touch component TC relating to all of the touch sensors on the touch detection surface. On the other hand, in the touch panel 1 according to the first embodiment, the labeling processing sections 43A to 43D perform the labeling processing on the binarized map data MAPA to MAPD, respectively. Therefore, since data amount to be handled is small, it is possible to reduce memory capacity.

Moreover, in the touch panel 1, the threshold setting section 41 obtains the four thresholds THA to THD based on the peak value of the touch component TC included in the map data MAP2. Therefore, it is possible to obtain the touch positions and the number of touch events more accurately. In other words, for example, in the case where a finger of a user is not in contact with the touch detection surface S and is in proximity to the touch detection surface S, the touch component TC is smaller than that in the case where the finger of the user is in contact with the touch detection surface S. Also in this case, the threshold setting section 41 obtains the four thresholds THA to THD based on the peak value of the touch component TC. Therefore, the touch regions TR are generated in each of the four pieces of the map data MAPA to MAPD. In other words, for example, when the four thresholds THA to THD are fixed, the touch region TR may possibly not be generated in one or more of the four pieces of the map data MAPA to MAPD. In the touch panel 1 according to the first embodiment, however, since the thresholds THA to THD are obtained based on the touch component TC, the touch regions TR are generated in each of the map data MAPA to MAPD. Accordingly, in the touch panel 1, it is possible to obtain the touch positions and the number of touch events more accurately.

Comparative Example

Next, a touch panel 1R according to a comparative example is described. In the comparative example, a digital processing section 30R that performs binarizing processing with use of a predetermined threshold and does not perform label replacement is used. Other configurations are similar to those in the first embodiment (FIG. 1 and the like).

Figure 15:
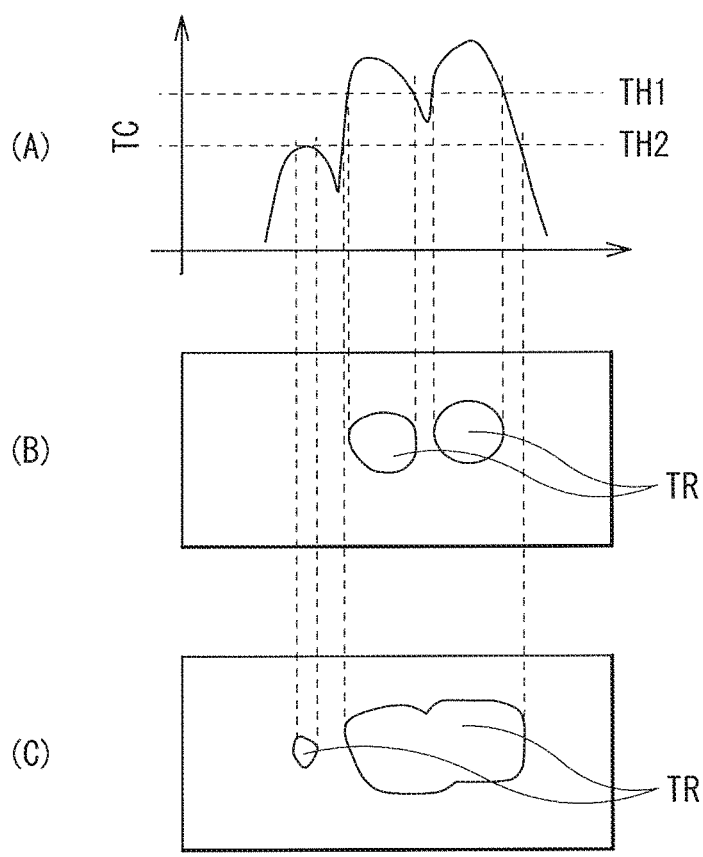
FIG. 15 is an explanatory diagram illustrating an operation example of a touch panel according to a comparative example.

FIG. 15 illustrates operation of a binarizing section 42R of the digital processing section 30R, where (A) illustrates the touch component TC, (B) illustrates map data in the case where the threshold is set to a high value, and (C) illustrates map data in the case where the threshold is set to a low value. Similar to FIG. 5, FIG. 15 illustrates operation when multi-touch is performed by three fingers of a user. In this example, as illustrated in (B) and (C) of FIG. 15, only two touch regions TR appear in the map data even when the threshold value is set to whatever value. In other words, in this example, the digital processing section 30R is not allowed to obtain three touch regions TR even though the user touches the touch panel with three fingers. In this way, in the touch panel 1R, the touch positions and the number of touch events may not be obtained accurately in the case of multi-touch.

On the other hand, in the touch panel 1 according to the first embodiment, after the four pieces of map data MAPA to MAPD are generated based on the four thresholds THA to THD and the labeling processing are performed on the four pieces of map data MAPA to MAPD, the label replacement is performed based on the inclusive relationship of the touch regions TR. Accordingly, in this example, the label replacement is performed based on the map data MAPA to MAPD (FIG. 7A to FIG. 7D) in which only two or less touch regions TR appear, which makes it possible to generate three touch regions TR as illustrated in FIG. 13. As a result, it is possible to obtain the touch positions and the number of touch events more accurately.

(Effects)

As described above, in the first embodiment, after the plurality of pieces of map data is generated based on the plurality of thresholds and the labeling processing is performed on the plurality of pieces of map data, the label replacement is performed based on the inclusive relationship of the touch regions. Therefore, in the case of multi-touch, it is possible to obtain the touch positions and the number of touch events more accurately.

In addition, in the first embodiment, the plurality of thresholds is obtained based on the peak value of the touch component. Therefore, it is possible to obtain the touch positions and the number of touch events more accurately even when the external proximity object is not in contact with the touch detection surface.

Moreover, in the first embodiment, each of the labeling sections performs the labeling processing on the binarized map data. Therefore, it is possible to reduce memory capacity.

(Modification 1-1)

In the above-described first embodiment, the threshold setting sections 41 generates the four thresholds THA to THD, and the four labeling processing sections 43A to 43D perform the labeling processing on the four pieces of map data MAPA to MAPD that are generated with use of the thresholds THA to THD, respectively. However, the configuration is not limited thereto, and alternatively, for example, the threshold setting section 41 may generate two, three, or five or more thresholds, and labeling processing sections of the same number (namely, two, three, or five or more) as the number of the thresholds may perform the labeling processing on the map data generated with use of the thresholds.

(Modification 1-2)

In the above-described first embodiment, the four labeling processing sections 43A to 43D are provided and the labeling processing on the map data MAPA to MAPD is performed by parallel processing. However, this is not limitative, and for example, one labeling processing section may be provided and the labeling processing may be time-divisionally performed on the map data MAPA to MAPD.

2. Second Embodiment

Next, a touch panel 2 according to a second embodiment is described. The touch panel 2 is configured using a touch region arithmetic section 54 that obtains the touch regions TR necessary for calculation of the touch positions by a method different from the method of the touch region arithmetic section 44. Other configurations of the touch panel 2 are similar to those in the above-described first embodiment (FIG. 1, FIG. 4, and the like). Note that like numerals are used to designate substantially like components of the touch panel 1 according to the above-described first embodiment, and the description thereof is appropriately omitted.

Figure 16:
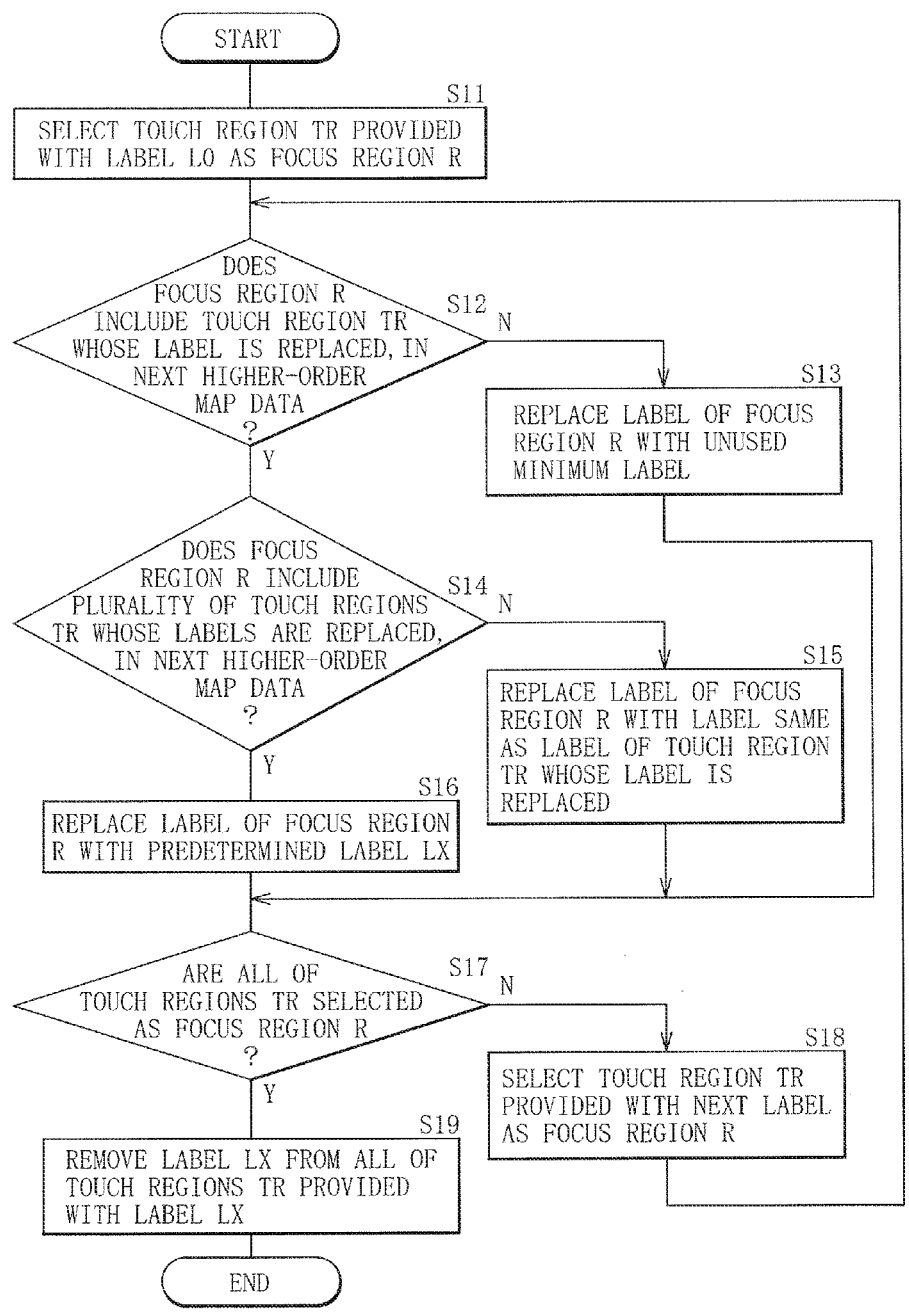
FIG. 16 is a flowchart illustrating an operation example of a touch region arithmetic section according to a second embodiment.

FIG. 16 illustrates a flowchart of operation of the touch region arithmetic section 54. The touch region arithmetic section 54 performs the following flow every time the four pieces of map data MAPA to MAPD and the label information LA to LD are supplied from the labeling processing sections 43A to 43D, respectively.

First, the touch region arithmetic section 54 selects the touch region TR provided with the label L0 as a focus region R (step S11). In other words, the touch region arithmetic section 54 focuses on the touch region TR provided with the label L0 in the highest-order map data MAPA.

Next, the touch region arithmetic section 54 confirms whether the focus region R includes the touch region TR with a replaced label in the map data higher order by one than the map data including the focus region R (step S12). When the focus region R does not include such a touch region TR, the label of the focus region R is replaced with an unused minimum label (step S13), and the process proceeds to step S17. Moreover, when the focus region R includes such a touch region TR, the process proceeds to step S14.

At the step S12, when the focus region R includes such a touch region TR, the touch region arithmetic section 54 confirms whether the focus region R includes a plurality of such touch regions TR (step S14). When the focus region R does not include the plurality of such touch regions TR, it means that the focus region R includes only one touch region TR. Therefore, the label of the focus region R is replaced with the label same as that of the one touch region TR (step S15), and the process proceeds to the step S17. Moreover, when the focus region R includes the plurality of such touch regions TR, the process proceeds to step S16.

At the step S14, when the focus region R includes the plurality of such touch regions TR, the touch region arithmetic section 54 replaces the label of the focus region R with a predetermined label LX (step S16). At this time, as the predetermined label LX, for example, a label of a large number that is not used in the labeling processing and the label replacement may be used.

Next, the touch region arithmetic section 54 confirms whether all of the touch regions TR in the map data MAPA to MAPD are selected as the focus region R (step S17). When all of the touch regions TR are not selected as the focus region R, the touch region arithmetic section 54 selects, as the focus region R, the touch region TR provided with a label subsequent to the label of the focus region R (step S18), and the process proceeds to the step S12.

At the step S17, when all of the touch regions TR are selected as the focus region R, the touch region arithmetic section 54 removes the label LX from all of the touch regions TR provided with the label LX (step S19).

The flow is ended in this way.

Next, operation of the touch region arithmetic section 54 will be described with the map data MAPA to MAPD and the label information LA to LD illustrated in FIGS. 7A to 7D as an example.

FIG. 17A to FIG. 17E illustrate an operation example of the touch region arithmetic section 54.

Figure 17A:
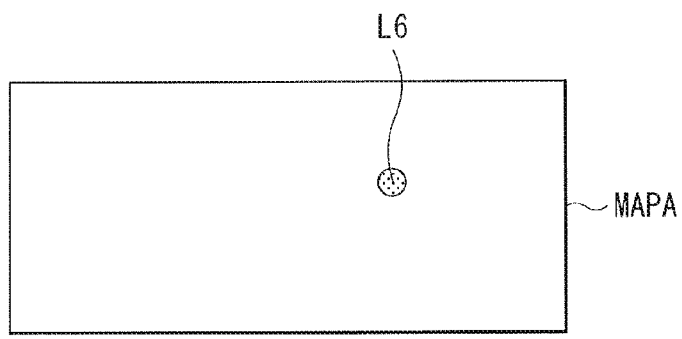
FIG. 17A is an explanatory diagram illustrating an operation example of the touch region arithmetic section according to the second embodiment.

First, the touch region arithmetic section 54 selects the touch region TR (FIG. 7A) provided with the label L0 as the focus region R (step S11). The focus region R is included in the highest-order map data MAPA and map data higher order than the map data MAPA is not present. Therefore the focus region R does not include the touch region TR with a replaced label in the higher-order map data (step S12). Therefore, the touch region arithmetic section 54 replaces the label L0 of the focus region R with a label L6 that is an unused minimum label (step S13). Specifically, as illustrated in FIGS. 7A to 7D, in this example, the labeling processing sections 43A to 43D provides the labels L0 to L5 to the touch regions TR in the map data MAPA to MAPD, respectively. Therefore, the unused minimum label is the label L6. Accordingly, the touch region arithmetic section 54 replaces the label L0 of the focus region R with the label L6. As a result, the label of the touch region TR in the map data MAPA is as illustrated in FIG. 17A. Incidentally, in this example, the label of the focus region R is replaced with the unused minimum label. However, this is not limitative, and alternatively, for example, the label of the focus region R may be replaced with a label that is not unused and so-called carry.

Next, the touch region arithmetic section 54 selects the touch region TR provided with the label L1 (FIG. 7B) as the focus region R (step S18). The focus region R includes one touch region TR whose label is replaced from the label L0 to the label L6 in the map data MAPA (FIG. 7A and FIG. 17A) higher order by one than the map data MAPB including the focus region R (steps S12 and S14). Accordingly, the touch region arithmetic section 54 replaces the label L1 of the focus region R with the label L6 (step S15).

Figure 17B:
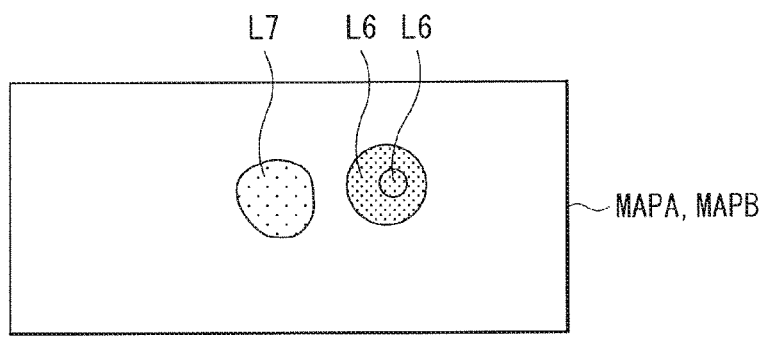
FIG. 17B is another explanatory diagram illustrating an operation example of the touch region arithmetic section according to the second embodiment.

Next, the touch region arithmetic section 54 selects the touch region TR provided with the label L2 (FIG. 7B) as the focus region R (step S18). The focus region R does not include the touch region TR with a replaced label in the map data MAPA (FIG. 7A and FIG. 17A) higher order by one than the map data MAPB including the focus region R (step S12). Therefore, the touch region arithmetic section 54 replaces the label L2 of the focus region R with a label L7 that is an unused minimum label (step S13). As a result, the labels of the touch regions TR in the map data MAPA and MAPB are as illustrated in FIG. 17B.

Next, the touch region arithmetic section 54 selects the touch region TR provided with the label L3 (FIG. 7C) as the focus region R (step S18). The focus region R includes the touch region TR whose label is replaced from the label L1 to the label L6 and the touch region TR whose label is replaced from the label L2 to the label L7 in the map data MAPB (FIG. 7B and FIG. 17B) higher order by one than the map data MAPC including the focus region R (steps S12 and S14). In other words, the focus region R includes the two touch regions TR in the next higher-order map data MAPB. Accordingly, the touch region arithmetic section 54 replaces the label L3 of the focus region R with the predetermined label LX (step S16).

Figure 17C:
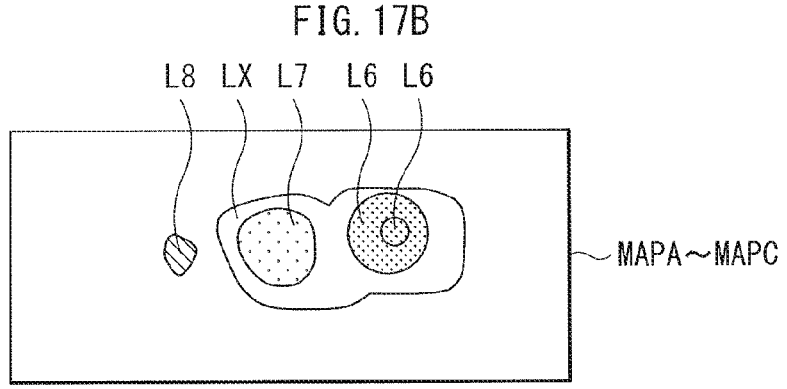
FIG. 17C is another explanatory diagram illustrating an operation example of the touch region arithmetic section according to the second embodiment.

Next, the touch region arithmetic section 54 selects the touch region TR provided with the label L4 (FIG. 7C) as the focus region R (step S18). The focus region R does not includes the touch region TR with the replaced label in the map data MAPB (FIG. 7B and FIG. 17B) higher order by one than the map data MAPC including the focus region R (step S12). Therefore, the touch region arithmetic section 54 replaces the label L4 of the focus region R with an unused minimum label L8 (step S13). As a result, the labels of the touch regions TR in the map data MAPA to MAPC are as illustrated in FIG. 17C.

Figure 17D:
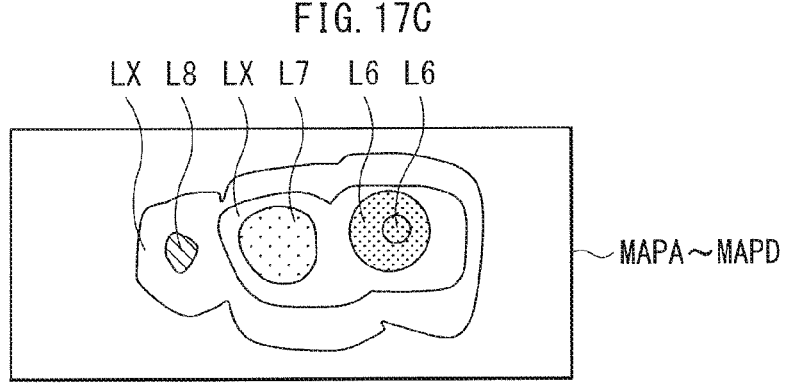
FIG. 17D is another explanatory diagram illustrating an operation example of the touch region arithmetic section according to the second embodiment.

Next, the touch region arithmetic section 54 selects the touch region TR provided with the label L5 (FIG. 7D) as the focus region R (step S18). The focus region R includes the touch region TR whose label is replaced from the label L3 to the label LX and the touch region TR whose label is replaced from the label L4 to the label L8 in the map data MAPC (FIG. 7C and FIG. 17C) higher order by one than the map data MAPD including the focus region R (steps S12 and S14). In other words, the focus region R includes the two touch regions TR in the next higher-order map data MAPC. Therefore, the touch region arithmetic section 54 replaces the label L5 of the focus region R with the predetermined label LX (step S16). As a result, the labels of the touch regions TR in the map data MAPA to MAPD are as illustrated in FIG. 17D.

Figure 17E:
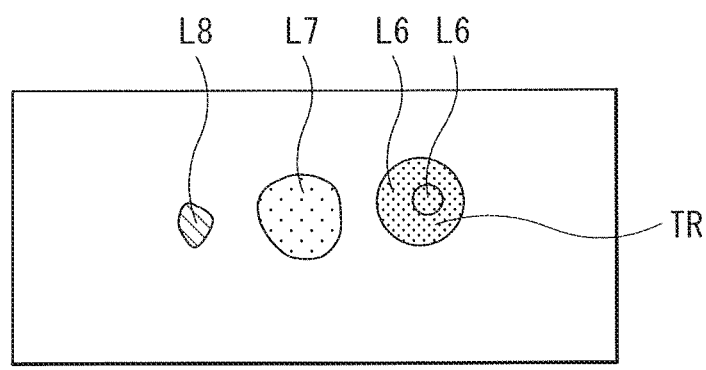
FIG. 17E is another explanatory diagram illustrating an operation example of the touch region arithmetic section according to the second embodiment.

Then, the touch region arithmetic section 54 removes the label LX from the all of the touch regions TR provided with the label LX (step S19). As a result, as illustrated in FIG. 17E, three touch region TR that are respectively provided with the labels L6, L7 and L8 and are separate from one another appear.

As described above, in the second embodiment, the label replacement is performed in order from the touch region provided with the label L0, namely, in order from the touch region included in the higher-order map data, based on the inclusive relationship of the touch regions. Even in this case, it is possible to obtain effects similar to those in the above-described first embodiment.

3. Third Embodiment

Next, a touch panel 3 according to a third embodiment is described. In the third embodiment, the touch regions TR necessary for calculation of touch positions are obtained while labeling on the map data MAPA to MAPD is performed. Specifically, in the above-described first embodiment and the like, after the labeling processing sections 43A to 43D perform the labeling processing, the touch regions TR necessary for calculation of the touch positions are obtained through the label replacement. In the third embodiment, however, the touch regions TR necessary for calculation of the touch positions are obtained while labeling processing is sequentially performed. Note that like numerals are used to designate substantially like components of the touch panel 1 according to the above-described first embodiment, and the description thereof is appropriately omitted.

As illustrated in FIG. 1, the touch panel 3 includes a digital signal processing section 60. The digital signal processing section 60 includes a touch position detection section 70.

Figure 18:
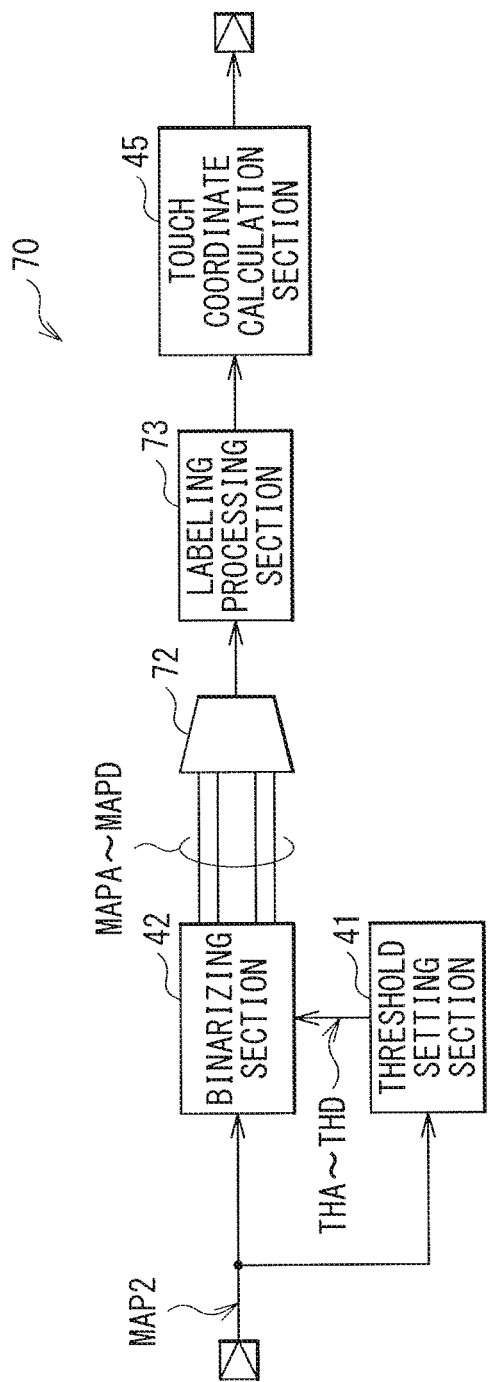
FIG. 18 is a block diagram illustrating an operation example of a touch position detection section according to a third embodiment.

FIG. 18 illustrates a configuration example of the touch position detection section 70. The touch position detection section 70 includes a multiplexer 72 and a labeling processing section 73. The multiplexer 72 selects and outputs one of the input map data MAPA to MAPD in order from the lower-order map data, namely, in order of the map data MAPD, MAPC, MAPB, and MAPA. The labeling processing section 73 performs the labeling processing in order from the lower-order map data based on the map data MAPA to MAPD that are sequentially supplied from the multiplexer 72, and obtains the touch regions TR necessary for calculation of the touch positions.

Figure 19:
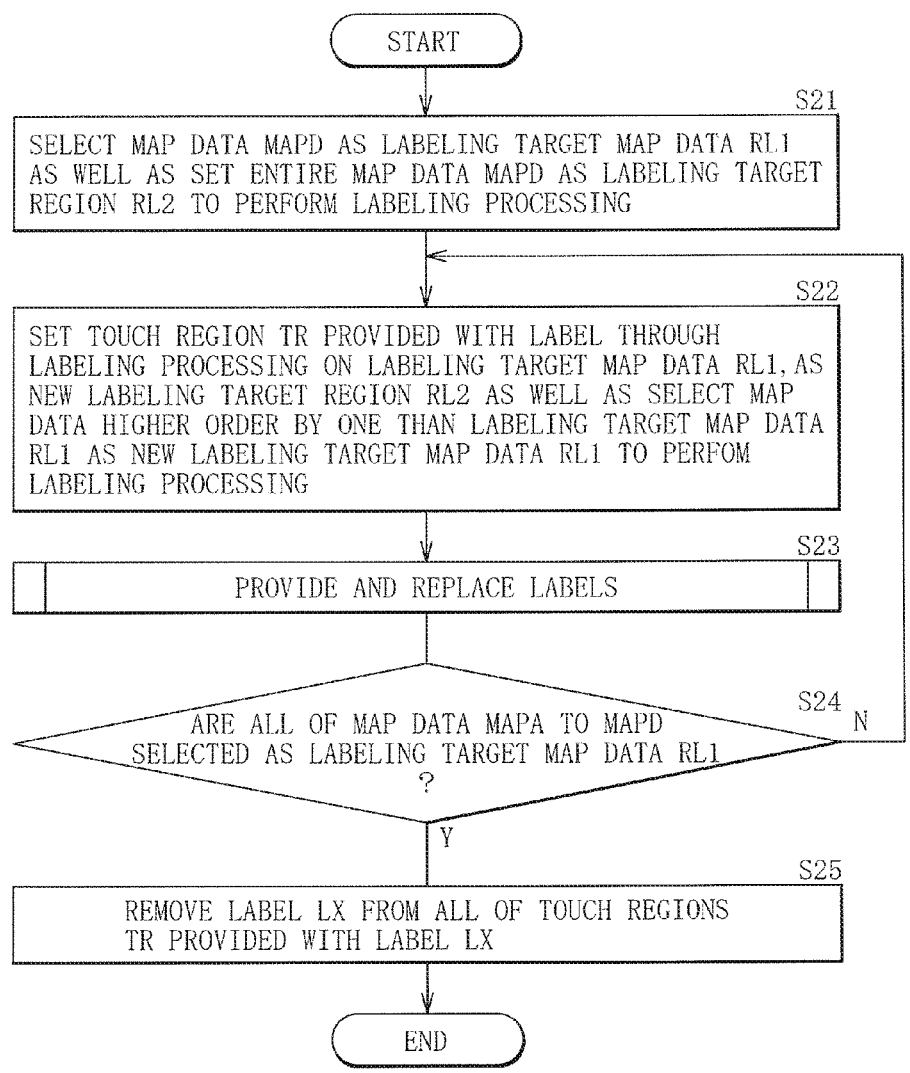
FIG. 19 is a flowchart illustrating an operation example of a labeling processing section illustrated in FIG. 18.

FIG. 19 illustrates a flowchart of operation of the labeling processing section 73.

First, the labeling processing section 73 selects the lowest-order map data MAPD as a labeling target map data RL1 as well as sets the entire map data MAPD as a labeling target region RL2, and performs the labeling processing on the labeling target region RL2 of the labeling target map data RL1 (step S21).

Then, the labeling processing section 73 sets the touch region TR that is provided with a label by the labeling processing on the labeling target map data RL1, as new labeling target region RL2 as well as selects map data higher order by one than the labeling target map data RL1, as new labeling target map data RL1, and performs the labeling processing on the labeling target region RL2 of the labeling target map data RL1 (step S22).

Next, the labeling processing section 73 provides and replaces the labels in the labeling processing at the step S22 (step S23).

Figure 20:
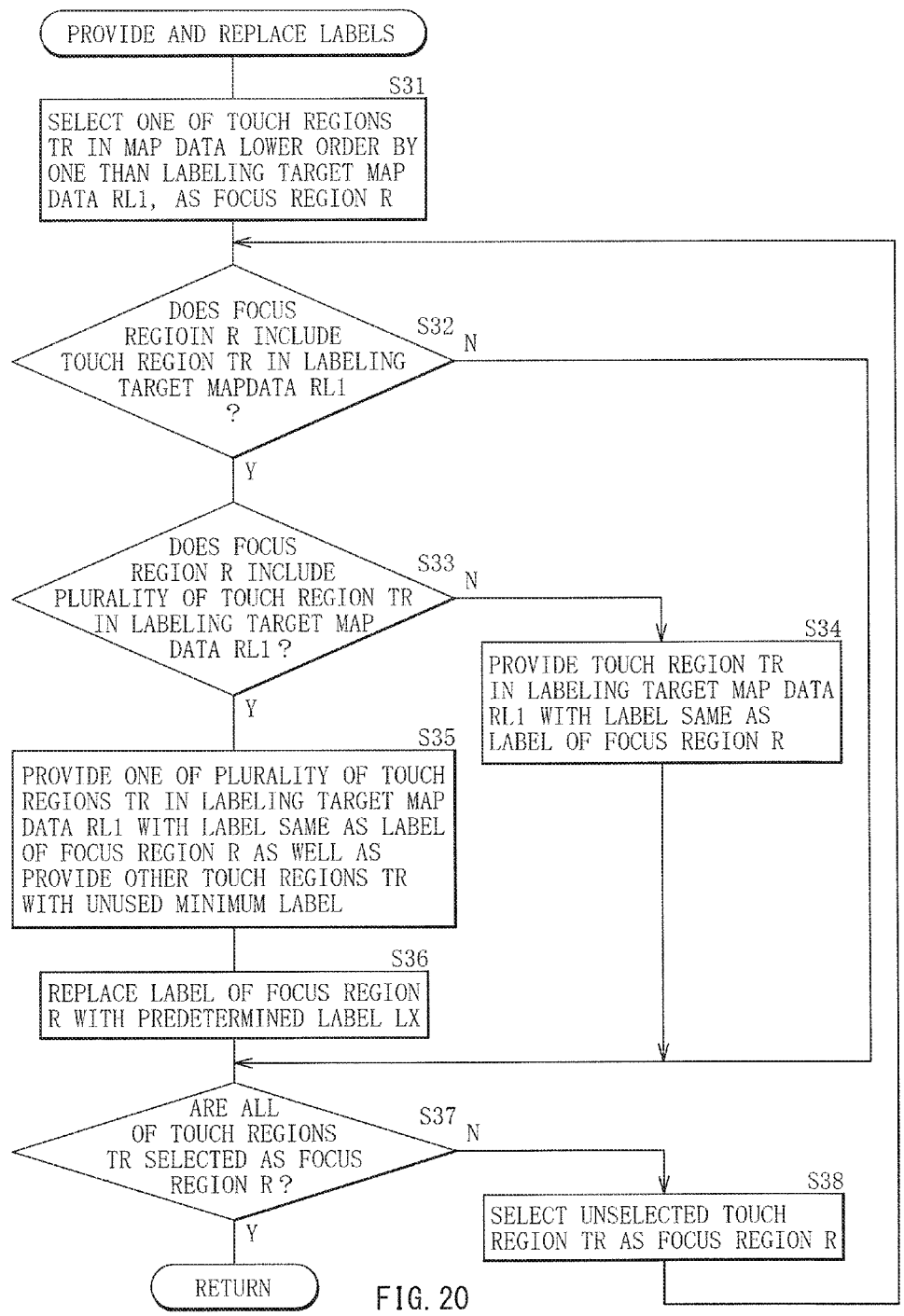
FIG. 20 is another flowchart illustrating an operation example of the labeling processing section illustrated in FIG. 18.

FIG. 20 illustrates a flowchart of operation of providing and replacing the labels.

First, the labeling processing section 73 selects one of the touch regions TR in the map data lower order by one than the labeling target map data RL1, as the focus region R (step S31).

Next, the labeling processing section 73 confirms whether the focus region R includes the touch region TR of the labeling target map data RL1 (step S32). When it is confirmed that the focus region R does not include such a touch region TR, the process proceeds to step S37.

At the step S32, when it is confirmed that the focus region R includes the touch region TR of the labeling target map data RL1, the labeling processing section 73 confirms whether the focus region R includes a plurality of the touch regions TR of the labeling target map data RL1 (step S33). When it is confirmed that the focus region R does not include the plurality of touch regions TR of the labeling target map data RL1, it means that the focus region R includes only one touch region TR. Therefore, the labeling processing section 73 provides the one touch region TR with the same label as that of the focus region R (step S34), and the process proceeds to the step S37.

At the step S33, when it is confirmed that the focus region R includes the plurality of touch regions TR of the labeling target map data RL1, the labeling processing section 73 provides one of the plurality of touch regions TR with the same label as that of the focus region R and provides the other touch regions TR with an unused minimum label (step S35).

Next, the labeling processing section 73 replaces the label of the focus region R with the predetermined label LX (step S36).

Next, the labeling processing section 73 confirms whether all of the touch regions TR in the map data lower order by one than the labeling target map data RL1 are selected as the focus region R (step S37). When it is confirmed that all of the touch regions TR are not selected as the focus region R, the labeling processing section 73 selects the touch region TR that is not yet selected, as the focus region R (step S38), and the process proceeds to the step S32.

At the step S37, when it is confirmed that all of the touch regions TR are selected as the focus region R, the labeling processing section 73 proceeds to step S24 (FIG. 19).

Next, the labeling processing section 73 confirms whether all of the map data MAPA to MAPD are selected as the labeling target map data RL1 (step S24). When it is confirmed that all of the map data MAPA to MAPD are not selected as the labeling target map data RL1, the process proceeds to the step S22.

At the step S24, when it is confirmed that all of the map data MAPA to MAPD are selected as the labeling target map data RL1, the labeling processing section 73 removes the label LX from all of the touch regions TR provided with the label LX (step S25).

The flow is ended in this way.

Next, operation of the labeling processing section 73 is described with the map data MAPA to MAPD illustrated in (C) to (F) of FIG. 5 as an example.

FIGS. 21A to 21E illustrate an operation example of the labeling processing section 73.

First, the labeling processing section 73 selects the map data MAPD ((F) of FIG. 5) as the labeling target map data RL1 as well as sets the entire map data MAPD as the labeling target region RL2 to perform the labeling processing (step S21). As a result, the label of the touch region TR in the map data MAPD is as illustrated in FIG. 21A.

Next, the labeling processing section 73 sets the touch region TR provided with the label L0 as new labeling target region RL2 as well as selects the map data MAPC ((E) of FIG. 5) higher order by one than the map data MAPD as the labeling target map data RL1 to perform the labeling processing (step S22).

Figure 21A:
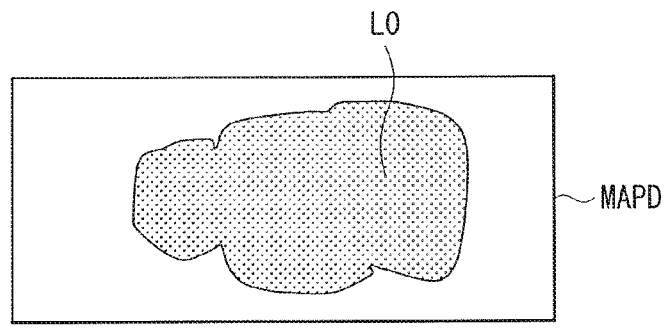
FIG. 21A is an explanatory diagram illustrating an operation example of the labeling processing section illustrated in FIG. 18.

At this time, first, the labeling processing section 73 selects, as the focus region R, the touch region TR provided with the label L0 in the map data MAPD ((F) of FIG. 5 and FIG. 21A) lower order by one than the labeling target map data RL1 (MAPC) (step S31). Since the focus region R includes two touch regions TR in the map data MAPC ((E) of FIG. 5) (steps S32 and S33), the labeling processing section 73 provides one of the two touch regions TR with the same label as the label L0 of the focus region R, and provides the other touch region TR with an unused minimum label L1 (step S35). Then, the labeling processing section 73 replaces the label of the focus region R from the label L0 to the predetermined label LX (step S36). After that, since only one touch region TR is included in the map data MAPD, the labeling processing section 73 determines that all of the touch regions TR are selected as the focus region R (step S37). As a result, the labels of the respective touch regions TR in the map data MAPC and MAPD are as illustrated in FIG. 21B.

Next, the labeling processing section 73 sets the two touch regions TR provided with the labels L0 and L1 in the map data MAPC, as new labeling target region RL2 as well as selects the map data MAPB ((D) of FIG. 5) higher order by one than the map data MAPC, as the labeling target map data RL1 to perform the labeling processing (step S22).

Figure 21B:
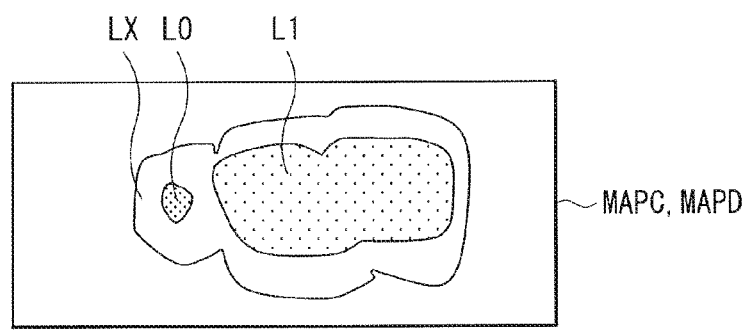
FIG. 21B is another explanatory diagram illustrating an operation example of the labeling processing section illustrated in FIG. 18.

At this time, first, the labeling processing section 73 selects the touch region TR provided with the label L0 in the map data MAPC ((E) of FIG. 5 and FIG. 21B) lower order by one than the labeling target map data RL1 (MAPB), as the focus region R (step S31). Since the focus region R does not include the touch region TR in the map data MABP ((D) of FIG. 5), the labeling processing section 73 then selects the touch region TR provided with the label L1 in the map data MAPC ((E) of FIG. 5 and FIG. 21B), as the focus region R (steps S37 and S38). Since the focus region R includes the two touch regions TR in the map data MAPB ((D) of FIG. 5) (steps S32 and S33), the labeling processing section 73 provides one of the two touch regions TR with the label same as the label L1 of the focus region R, and provides the other touch region TR with an unused minimum label L2 (step S35). In addition, the labeling processing section 73 replaces the label of the focus region R from the label L1 to the predetermined label LX (step S36). As a result, the labels of the respective touch regions TR in the map data MAPB to MAPD are as illustrated in FIG. 21C.

Next, the labeling processing section 73 sets the touch regions TR provided with the labels L1 and L2 in the map data MAPB as new labeling target region RL2 as well as selects the map data MAPA ((C) of FIG. 5) higher order by one than the map data MAPB as the labeling target map data RL1 to perform the labeling processing (step S22).

Figure 21C:
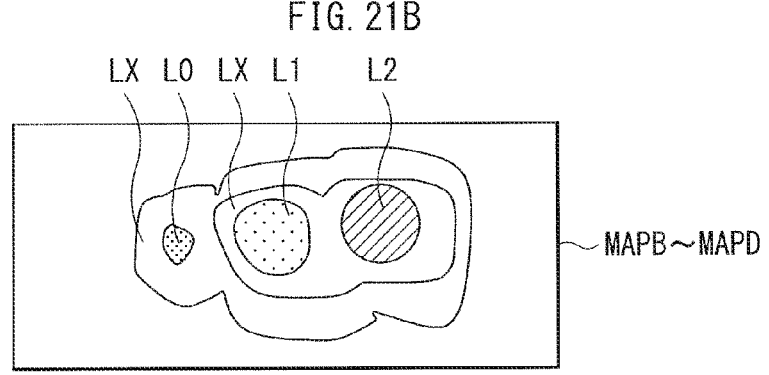
FIG. 21C is another explanatory diagram illustrating an operation example of the labeling processing section illustrated in FIG. 18.
Figure 21D:
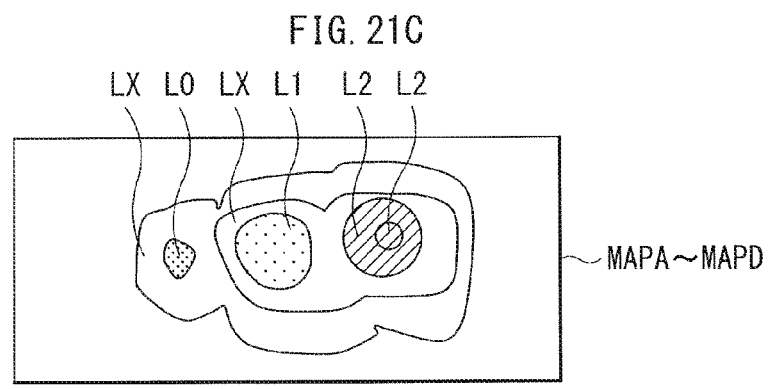
FIG. 21D is another explanatory diagram illustrating an operation example of the labeling processing section illustrated in FIG. 18.

At this time, first, the labeling processing section 73 selects the touch region TR provided with the label L1 in the map data MAPB ((D) of FIG. 5 and FIG. 21C) lower order by one than the labeling target map data RL1 (MAPA), as the focus region R (step S31). Since the focus region R does not include the touch region TR in the map data MAPA ((C) of FIG. 5) (step S32), the labeling processing section 73 then selects the touch region TR provided with the label L2 in the map data MAPB ((D) of FIG. 5 and FIG. 21C), as the focus region R (steps S37 and S38). Since the focus region R includes one touch region TR in the map data MAPA ((C) of FIG. 5) (steps S32 and S33), the labeling processing section 73 provides the touch region TR with the label same as the label L2 of the focus region R (step S34). As a result, the labels of the respective touch regions TR in the map data MAPA to MAPD are as illustrated in FIG. 21D.

Figure 21E:
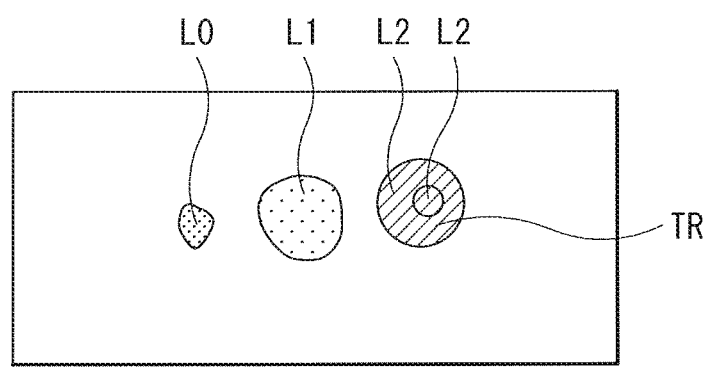
FIG. 21E is another explanatory diagram illustrating an operation example of the labeling processing section illustrated in FIG. 18.

Then, the labeling processing section 73 removes the label LX from all of the touch regions TR provided with the label LX (step S25). As a result, as illustrated in FIG. 21E, three touch regions TR that are provided with the labels L0, L1, and L2 and are separated from one another appear.

As described above, in the third embodiment, the labeling processing is performed in order from lower-order map data while the labeling target region is narrowed based on the inclusive relationship of the touch regions. Accordingly, it is possible to obtain effects similar to those in the above-described first embodiment and the like.

4. Application Examples

Next, application examples of the touch panel described in the above-described embodiments and modifications will be described.

Figure 22:
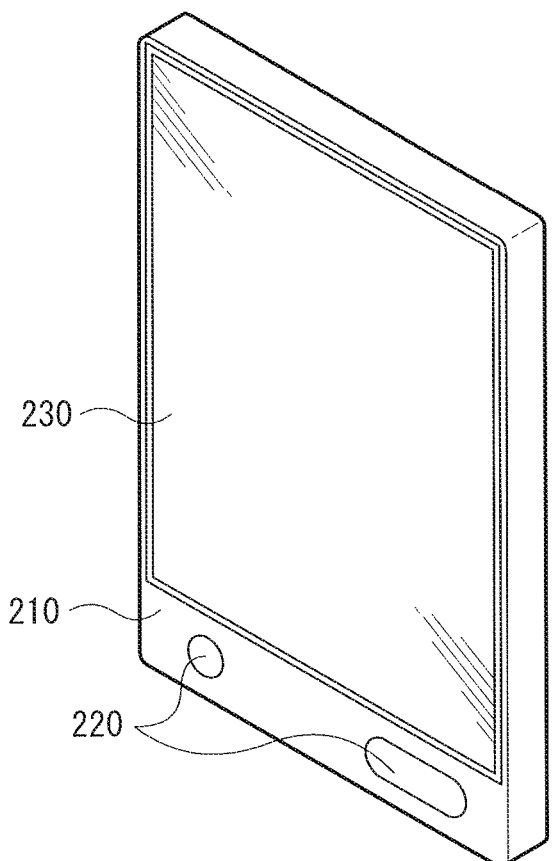
FIG. 22 is a perspective view illustrating an appearance configuration of a smartphone to which any of the embodiments is applied.

FIG. 22 illustrates an appearance of a smartphone to which the touch panel according to any of the above-described embodiments and the like is applied. For example, the smartphone may include a main body 210, an operation section 220, and a display section 230. The touch panel according to any of the above-described embodiments and the like is applied to the display section 230.

Figure 23:
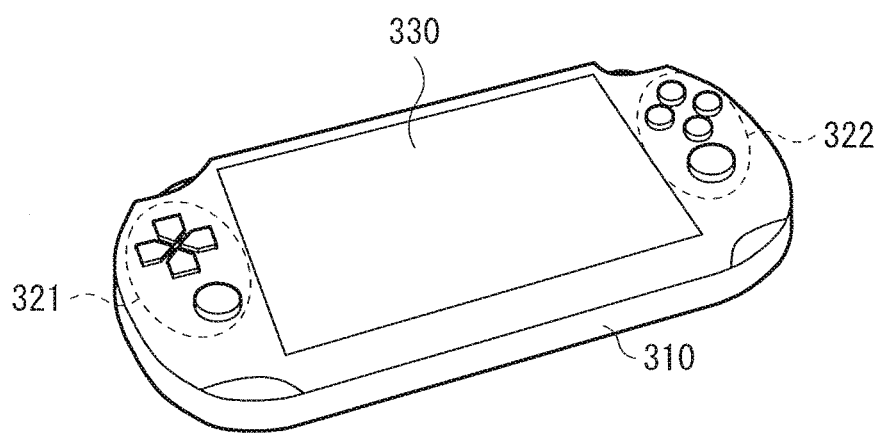
FIG. 23 is a perspective view illustrating an appearance configuration of a portable game machine to which any of the embodiments is applied.

FIG. 23 illustrates an appearance of a portable game machine to which the touch panel according to any of the above-described embodiments and the like is applied. For example, the portable game machine may include a main body 310, operation sections 321 and 322, and a display section 330. The touch panel according to any of the above-described embodiments and the like is applied to the display section 330.

Figure 24:
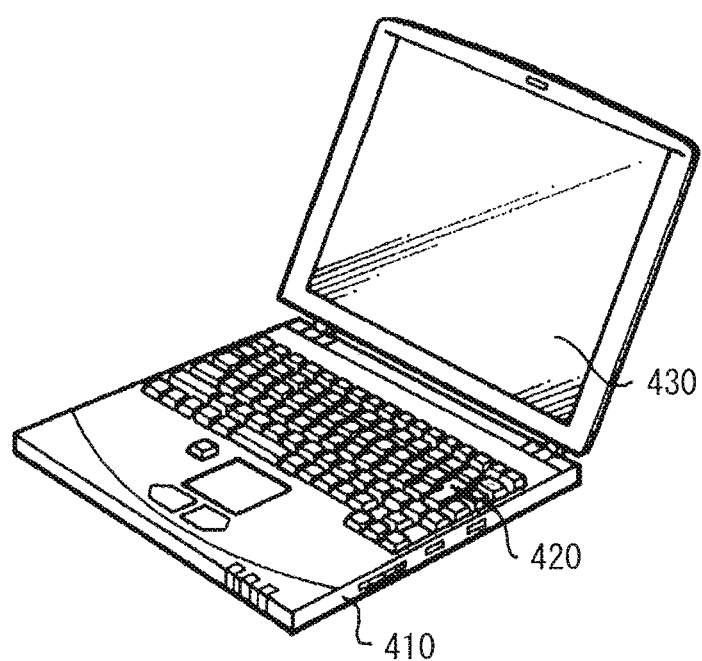
FIG. 24 is a perspective view illustrating an appearance configuration of a notebook personal computer to which any of the embodiments is applied.

FIG. 24 illustrates an appearance of a notebook personal computer to which the touch panel according to any of the above-described embodiment and the like is applied. For example, the notebook personal computer includes a main body 410, a key board 420, and a display section 430. The touch panel according to any of the above-described embodiments and the like is applied to the display section 430.

The touch panel according to any of the above-described embodiments and the like is applicable to electronic apparatuses in all fields, such as a portable music player, a digital camera, and a video camera, in addition to the smart phone, the portable game player, and the notebook personal computer described above. In other words, the touch panel according to any of the above-described embodiments and the like is applicable to electronic apparatuses each displaying an image, in all fields.

Hereinbefore, although the technology has been described with referring to the embodiments, the modifications, and the application examples to the electronic apparatuses, the technology is not limited thereto, and various modifications may be made.

For example, in each of the above-described embodiments, the electrostatic capacitance type touch detection device 10 is used. However, this is not limitative, and alternatively, for example, a touch detection device of an optical type or the like maybe used.

In addition, for example, in each of the above-described embodiments, the touch panel is singularly configured. However, this is not limitative, and alternatively, for example, a display panel and a touch panel may be integrally configured, and thus the display panel may have a touch detection function. Specifically, for example, a so-called on-cell type display panel in which a touch detection device is formed directly on a display surface of a display panel, or a so-called in-cell type display panel in which a touch detection device is formed in a display panel may be used.

Note that the technology may be configured as follows.
(1) A touch detection circuit including:
  a map generation section configured to compare a touch signal corresponding to a proximity state of an external proximity object with each of a plurality of thresholds to generate a plurality of pieces of map data each showing touch regions;
  a labeling section configured to selectively perform labeling on the touch regions in the plurality of pieces of map data, based on inclusive relationship of the touch regions between the plurality of pieces of map data; and
  a detection section configured to perform touch detection based on processing results by the labeling section.
(2) The touch detection circuit according to (1), further including
  a threshold setting section configured to set the plurality of thresholds based on the touch signal.
(3) The touch detection circuit according to (1) or (2), wherein the detection section detects the number of touch events and touch positions.
(4) The touch detection circuit according to any one of (1) to (3), wherein the labeling section generates a first label set indicating correspondence between the touch regions and labels by
  providing the labels to the respective touch regions in each of the map data, and
  sequentially selecting two pieces of map data corresponding to two thresholds adjacent to each other, from the plurality of pieces of map data, and replacing the labels based on the inclusive relationship of the touch regions in the selected two pieces of map data.
(5) The touch detection circuit according to (4), wherein the labeling section generates the first label set by,
  when one touch region in low-order map data corresponding to a low threshold, of the selected two pieces of map data, includes a plurality of touch regions in high-order map data corresponding to a high threshold, replacing a label of one of the plurality of touch regions in the high-order map data with a label same as a label of the one touch region in the low-order map data, and
  when one touch region in the low-order map data of the selected two pieces of map data includes a single touch region in the high-order map data, replacing a label of the single touch region with a label same as a label of the one touch region.
(6) The touch detection circuit according to (4) or (5), wherein the labeling section generates a second label set by, after generating the first label set, sequentially selecting two pieces of map data corresponding to two thresholds adjacent to each other, from the plurality of pieces of map data, and when one touch region in the low-order map data corresponding to a low threshold, of the selected two pieces of map data, includes a plurality of touch regions in high-order map data corresponding to a high threshold, removing a label of the one touch region in the first label set.
(7) The touch detection circuit according to (4), wherein the labeling section selects the two pieces of map data in order from map data corresponding to a high threshold.
(8) The touch detection circuit according to (7), wherein the labeling section generates the first label set by,
  when one touch region in low-order map data corresponding to a low threshold, of the selected two pieces of map data, includes a plurality of touch regions in high-order map data corresponding to a high threshold, replacing a label of the one touch region with a dummy label, and
  when one touch region in the low-order map data of the selected two pieces of map data includes a single touch region in the high-order map data, replacing the label of the one touch region with a label same as a label of the single touch region.
(9) The touch detection circuit according to (8), wherein the labeling section generates a second label set by, after generating the first label set, removing the dummy label from the first label set.
(10) The touch detection circuit according to any one of (1) to (3), wherein the labeling section generates a first label set indicating correspondence between the touch regions and labels by sequentially selecting two pieces of map data corresponding to two thresholds adjacent to each other, from the plurality of pieces of map data, and providing labels to the respective touch regions in each of the map data, based on inclusive relationship of the touch regions in the selected two pieces of map data.
(11) The touch detection circuit according to (10), wherein the labeling section selects the two pieces of map data in order from map data corresponding to a low threshold.
(12) The touch detection circuit according to (11), wherein
  when one touch region in low-order map data corresponding to the low threshold, of the selected two pieces of map data, includes a plurality of touch regions in high-order map data corresponding to a high threshold, the labeling section replaces a label of the one touch region with a dummy label after providing one of the plurality of touch regions with a label same as the label of the one touch region, and
  when one touch region in the low-order map data of the selected two pieces of map data includes a single touch region in the high-order map data, the labeling section provides the single touch region with a label same as the label of the one touch region.
(13) The touch detection circuit according to (12), wherein the labeling section generates a second label set by, after generating the first label set, removing the dummy label from the first label set.
(14) A touch detection method including:
  comparing a touch signal corresponding to a proximity state of an external proximity object with each of a plurality of thresholds to generate a plurality of pieces of map data each showing touch regions;

selectively performing labeling on the touch regions in the plurality of pieces of map data based on inclusive relationship of the touch regions between the plurality of pieces of map data; and performing touch detection based on labeling results.

(15) An electronic apparatus provided with a touch detection device configured to detect an external proximity object, and a touch detection circuit, the touch detection circuit including:

a map generation section configured to compare a touch signal corresponding to a proximity state of the external proximity object to the touch detection device with each of a plurality of thresholds to generate a plurality of pieces of map data each showing touch regions;

a labeling section configured to selectively perform labeling on the touch regions in the plurality of pieces of map data, based on inclusive relationship of the touch regions between the plurality of pieces of map data; and a detection section configured to perform touch detection based on processing results by the labeling section.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch detection circuit comprising:
    a map generation section configured to compare a touch signal corresponding to a proximity state of an external proximity object with each of a plurality of thresholds to generate a plurality of pieces of map data each showing touch regions;
    a labeling section configured to selectively perform labeling on the touch regions in the plurality of pieces of map data, based on inclusive relationship of the touch regions between the plurality of pieces of map data; and
    a detection section configured to perform touch detection based on processing results by the labeling section, wherein
    the labeling section generates a first label set indicating correspondence between the touch regions and labels by sequentially selecting two pieces of map data corresponding to two thresholds adjacent to each other, from the plurality of pieces of map data, and providing labels to the respective touch regions in each of the map data, based on inclusive relationship of the touch regions in the selected two pieces of map data.

2. The touch detection circuit according to claim 1, wherein the labeling section selects the two pieces of map data in order from map data corresponding to a low threshold.

3. The touch detection circuit according to claim 2, wherein
    when one touch region in low-order map data corresponding to the low threshold, of the selected two pieces of map data, includes a plurality of touch regions in high-order map data corresponding to a high threshold, the labeling section replaces a label of the one touch region with a dummy label after providing one of the plurality of touch regions with a label same as the label of the one touch region, and
    when one touch region in the low-order map data of the selected two pieces of map data includes a single touch region in the high-order map data, the labeling section provides the single touch region with a label same as the label of the one touch region.

4. The touch detection circuit according to claim 3, wherein the labeling section generates a second label set by, after generating the first label set, removing the dummy label from the first label set.

* * * * *